(12) United States Patent
Ishidera

(10) Patent No.: US 9,342,127 B2
(45) Date of Patent: May 17, 2016

(54) ELECTRONIC APPARATUS, AND CHARGING CONTROL METHOD

(75) Inventor: Nobutaka Ishidera, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 741 days.

(21) Appl. No.: 13/477,167

(22) Filed: May 22, 2012

(65) Prior Publication Data

US 2013/0009468 A1    Jan. 10, 2013

(30) Foreign Application Priority Data

Jul. 5, 2011    (JP) ................................. 2011-149372

(51) Int. Cl.
| | | |
|---|---|---|
| H02J 1/10 | (2006.01) | |
| H02J 3/46 | (2006.01) | |
| G06F 1/26 | (2006.01) | |
| H01M 10/44 | (2006.01) | |
| H01M 10/46 | (2006.01) | |
| H01M 10/48 | (2006.01) | |
| H01M 10/42 | (2006.01) | |

(52) U.S. Cl.
CPC .............. *G06F 1/263* (2013.01); *H01M 10/44* (2013.01); *H01M 10/46* (2013.01); *H01M 10/48* (2013.01); *H01M 2010/4271* (2013.01); *Y10T 307/352* (2015.04)

(58) Field of Classification Search
CPC ....... G06F 1/263; H01M 10/46; H01M 10/44; H01M 10/48; H01M 2010/4271
USPC .......................................... 307/24
See application file for complete search history.

(56) References Cited

U.S. PATENT DOCUMENTS

| | | | | |
|---|---|---|---|---|
| 6,563,766 B1 * | 5/2003 | Nakamiya | .............. | G04C 10/04 320/162 |
| 6,927,552 B2 * | 8/2005 | Kuroda | .................... | H02J 7/14 320/104 |
| 7,429,911 B2 * | 9/2008 | Hirose | ..................... | G06F 1/26 340/5.1 |

(Continued)

FOREIGN PATENT DOCUMENTS

| | | |
|---|---|---|
| JP | 2002-271992 A | 9/2002 |
| JP | 2005-182626 A | 7/2005 |

(Continued)

OTHER PUBLICATIONS

Office Action of Korean Patent Application No. 10-2012-0060183 dated Feb. 4, 2014 with whole translated Office Action.

(Continued)

*Primary Examiner* — Hal Kaplan
*Assistant Examiner* — Esayas Yeshaw
(74) *Attorney, Agent, or Firm* — Maschoff Brennan

(57) ABSTRACT

An electronic apparatus that selectively uses as a power source one of a battery and an external power source to be powered therefrom, the electronic apparatus includes: a charging unit that charges the battery through the external power source; a power status determining unit that determines whether the external power source can drive the electronic apparatus; a history storage unit that stores a history of determination results of the power status determining unit; and a charging control unit that sets, to a maximum capacity of the battery, an upper limit of battery remaining power if the history indicates that the external power source can not drive for at least part of a specific past period, or sets the upper limit to a given value lower than the maximum capacity if the history indicates that the external power source can drive throughout the specific past period.

6 Claims, 18 Drawing Sheets

211

| GRID COORDINATES (LATITUDE/LONGITUDE) | NAME OF ELECTRIC POWER COMPANY | PEAK SHIFT TIME BAND | | PEAK SHIFT ADVANTAGE |
|---|---|---|---|---|
| | | START TIME | END TIME | |
| TOP LEFT : 35.700N/139.700E BOTTOM RIGHT : 35.600N/139.800E | POWER COMPANY A | 2:00 | 6:00 | 3 YEN PER 1 kW CARBON DIOXIDE EMISSION REDUCTION |
| TOP LEFT : 35.800N/139.700E BOTTOM RIGHT : 35.700N/139.800E | | | | |
| TOP LEFT : 38.300N/140.800E BOTTOM RIGHT : 38.200N/140.900E | POWER COMPANY B | 0:00 | 5:00 | 2 YEN PER 1 kW CARBON DIOXIDE EMISSION REDUCTION |
| ⋮ | ⋮ | ⋮ | ⋮ | ⋮ |

(56) References Cited

U.S. PATENT DOCUMENTS

| | | |
|---|---|---|
| 2002/0140400 A1 | 10/2002 | Hatori et al. |
| 2004/0263122 A1* | 12/2004 | Morisawa ............... H02J 3/14 320/127 |
| 2005/0057224 A1* | 3/2005 | Naitoh .................. G06F 1/263 320/128 |
| 2005/0156571 A1 | 7/2005 | Inui et al. |
| 2011/0127949 A1* | 6/2011 | Taki ............................ 320/107 |
| 2011/0175445 A1* | 7/2011 | Hung ............... H01M 8/04619 307/24 |
| 2012/0019210 A1* | 1/2012 | Wakamatsu ........ H01M 10/425 320/134 |

FOREIGN PATENT DOCUMENTS

| | | |
|---|---|---|
| JP | 2007-336796 A | 12/2007 |
| JP | 2011-120316 A | 6/2011 |

OTHER PUBLICATIONS

Office Action of Chinese Patent Application No. 201210232389.3 dated Aug. 1, 2014 with Partial translated Office Action.

Office Action of Japanese Patent Application No. 2011-149372 dated Dec. 9, 2014 with Partial Translation.

* cited by examiner

FIG. 5

| GRID COORDINATES (LATITUDE/LONGITUDE) | NAME OF ELECTRIC POWER COMPANY | PEAK SHIFT TIME BAND | | PEAK SHIFT ADVANTAGE |
|---|---|---|---|---|
| | | START TIME | END TIME | |
| TOP LEFT : 35.700N/139.700E BOTTOM RIGHT : 35.600N/139.800E | POWER COMPANY A | 2:00 | 6:00 | 3 YEN PER 1 kW CARBON DIOXIDE EMISSION REDUCTION |
| TOP LEFT : 35.800N/139.700E BOTTOM RIGHT : 35.700N/139.800E | POWER COMPANY B | 0:00 | 5:00 | 2 YEN PER 1 kW CARBON DIOXIDE EMISSION REDUCTION |
| TOP LEFT : 38.300N/140.800E BOTTOM RIGHT : 38.200N/140.900E | ... | ... | ... | ... |

| TIME AND DATE | AC CONNECTION STATUS | REMAINING BATTERY POWER (%) |
|---|---|---|
| 03/08/2011 7:00 | 1 | 95 |
| 03/08/2011 7:10 | 1 | 100 |
| 03/08/2011 7:20 | 1 | 100 |
| 03/08/2011 7:30 | 1 | 100 |
| 03/08/2011 7:40 | 0 | 95 |
| 03/08/2011 7:50 | 0 | 80 |
| ⋮ | ⋮ | ⋮ |

FIG. 11

BATTERY CHARGING AND DISCHARGING SETTING — 164a

POWER COMPANY UNDER CONTRACT: COMPANY A

EFFORTS TO SAVE POWER DURING PEAK SHIFT TIME BAND PROVIDES ADVANTAGES AS BELOW
 PEAK SHIFT TIME BAND: 2:00 - 6:00
 ADVANTAGE OF PEAK SHIFT: DISCOUNT OF 3 YEN PER 1 kW
 CARBON DIOXIDE REDUCTION

CURRENT SETTING OF BATTERY CHARGING RATE: 100%

WITH BATTERY CHARGED TO CHARGING RATE OF 100%, PERSONAL COMPUTER IS EXPECTED TO OPERATE FROM BATTERY FOR LONGER TIME.

WITH BATTERY CHARGED TO CHARGING RATE OF 80%, PERSONAL COMPUTER IS EXPECTED TO OPERATE FROM BATTERY FOR SHORTER TIME, BUT LIFE EXPECTANCY OF BATTERY BECOMES LONGER.

IF YOU CARRY PERSONAL COMPUTER LESS FREQUENTLY, OR FOR SHORT PERIOD OF TIME IF CARRIED, IT IS ADVISABLE TO CHARGE BATTERY TO CHARGING RATE OF 80%.

DIAGNOSIS RESULT OF COMPUTER USE: 80% CHARGING RATE IS ADVISABLE

CLICKING BUTTON ACTIVATES OPERATION TO CHARGE BATTERY DURING PEAK SHIFT TIME BAND ONLY, AND FUNCTION TO AUTOMATICALLY SWITCH CHARGING RATE IN RESPONSE TO COMPUTER USE STATUS

[ AUTOMATICALLY CONTROL CHARGING AND DISCHARGING SETTING ] — 164b

[ CLOSE ] — 164c

ELECTRONIC APPARATUS, AND CHARGING CONTROL METHOD

CROSS-REFERENCE TO RELATED APPLICATION

This application is based upon and claims the benefit of priority of the prior Japanese Patent Application No. 2011-149372, filed on Jul. 5, 2011, the entire contents of which are incorporated herein by reference.

FIELD

The embodiments discussed herein are related to an electronic apparatus and a charging control method.

BACKGROUND

It is known that repeated overcharging of batteries powering portable electronic apparatuses including notebook personal computers degrades performance of the batteries. For example, the capacity of a battery at a fully charged state may drop, or the life expectancy of the battery may be shortened. In one of the related art methods to control performance degradation of the battery, an upper limit of charged level is restricted to a specific level lower than the battery capacity at the fully charged state (for example, to 80% of the battery capacity). One available information processing apparatus gradually lowers the upper limit of the charged amount of the battery with time.

Japanese Laid-open Patent Publication No. 2005-182626 discusses such a technique.

If the upper limit to the charged amount to the battery is restricted, an operation time to power an electronic apparatus is shorter than if charging is performed to a maximum chargeable capacity (rated value). This inconveniences the user of the electronic apparatus.

SUMMARY

According to an aspect of the invention, an electronic apparatus that selectively uses as a power source one of a battery and an external power source to be powered therefrom, the electronic apparatus includes: a charging unit that charges the battery through the external power source; a power status determining unit that determines whether the external power source can drive the electronic apparatus; a history storage unit that stores a history of determination results of the power status determining unit; and a charging control unit that sets, to a maximum capacity of the battery, an upper limit of battery remaining power at which a charging operation of the charging unit is determined as being complete if the history of the determination results indicates that the external power source can not drive the electronic apparatus for at least part of a specific past period, or sets the upper limit to a given value lower than the maximum capacity if the history of the determination results indicates that the external power source can drive the electronic apparatus throughout the specific past period.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of information stored on a peak shift database;

FIG. 9 illustrates an example of information stored on a power status database;

FIG. 11 illustrates a display example of an advice screen;

DESCRIPTION OF EMBODIMENTS

The embodiments are described below with reference to the drawings.

First Embodiment

Figure 1:
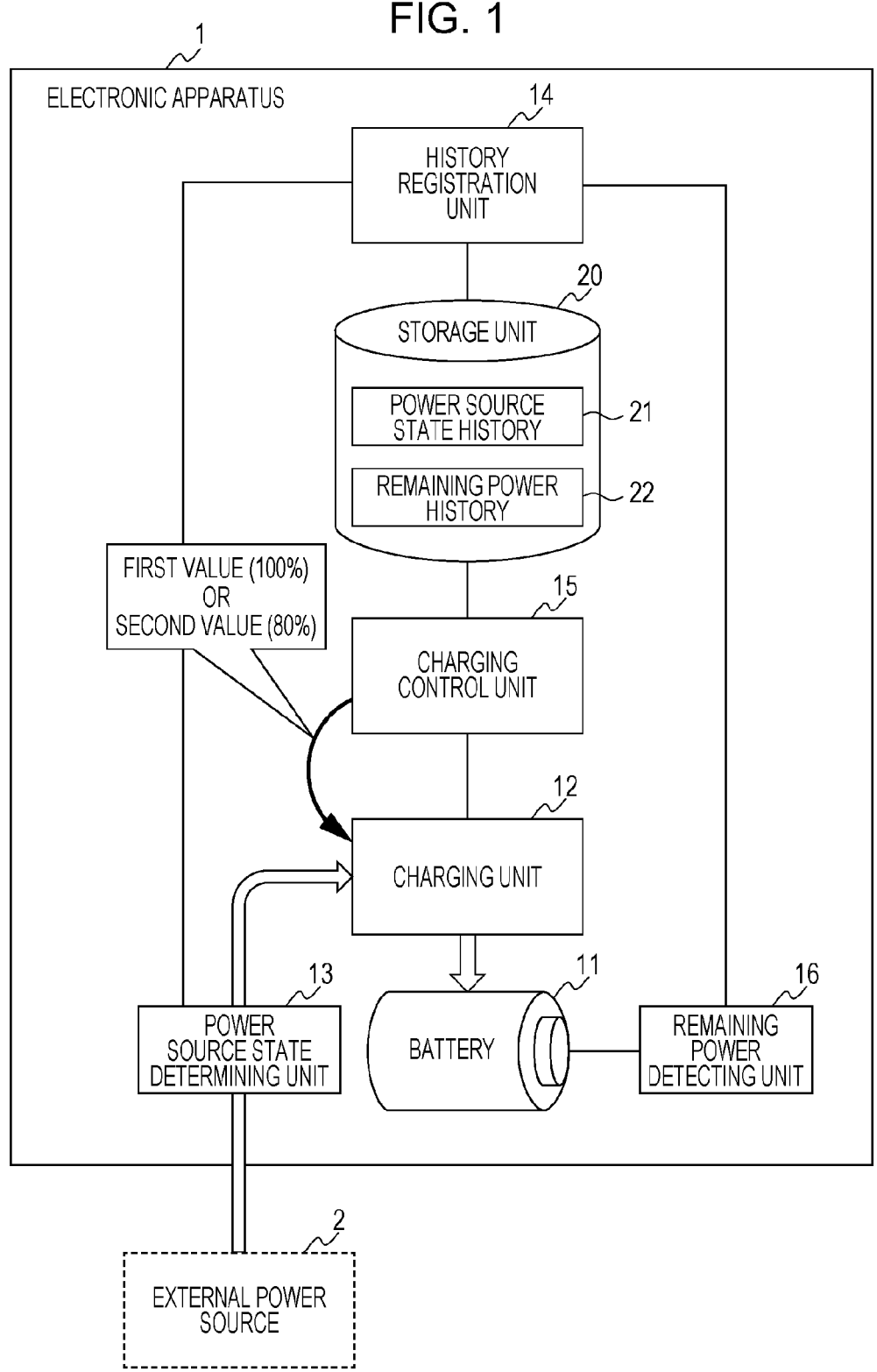
FIG. 1 illustrates a configuration of an electronic apparatus of a first embodiment.

FIG. 1 illustrates a configuration of an electronic apparatus 1 of a first embodiment.

The electronic apparatus 1 of FIG. 1 is powered selectively by a battery 11 and an external power source 2. The external power source 2 may be a typical commercial alternating current (AC) power source. The electronic apparatus 1 includes a charging unit 12 that charges the battery 11. The charging unit 12 charges the battery 11 via the external power source 2.

The electronic apparatus 1 further includes power source state determining unit 13, history registration unit 14, and charging control unit 15. The power source state determining unit 13 determines whether the electronic apparatus 1 is in a state that the electronic apparatus 1 is able to be powered by the external power source 2. For example, if a cable is connected to the electronic apparatus 1 to receive power supplied from the external power source 2, and the cable is supplied with power from the external power source 2, the power source state determining unit 13 determines that the electronic apparatus 1 is in a state that the electronic apparatus 1 is able to be powered by the external power source 2.

The history registration unit 14 stores a history of determination results of the power source state determining unit 13 on a storage unit 20 as a power source state history 21. The storage unit 20 may be arranged to be internal or external to the electronic apparatus 1.

In accordance with the power source state history 21 stored on the storage unit 20, the charging control unit 15 sets to one of a first value and a second value an upper limit of battery remaining power (hereinafter referred to as an "upper limit of charged amount") at which the charging of the charging unit 12 is determined as being complete. The first value is a maximum capacity of the battery 11 (i.e., 100% of the battery capacity), and the second value is a value lower than the maximum capacity (for example, 80% of the battery capacity).

Figure 2:
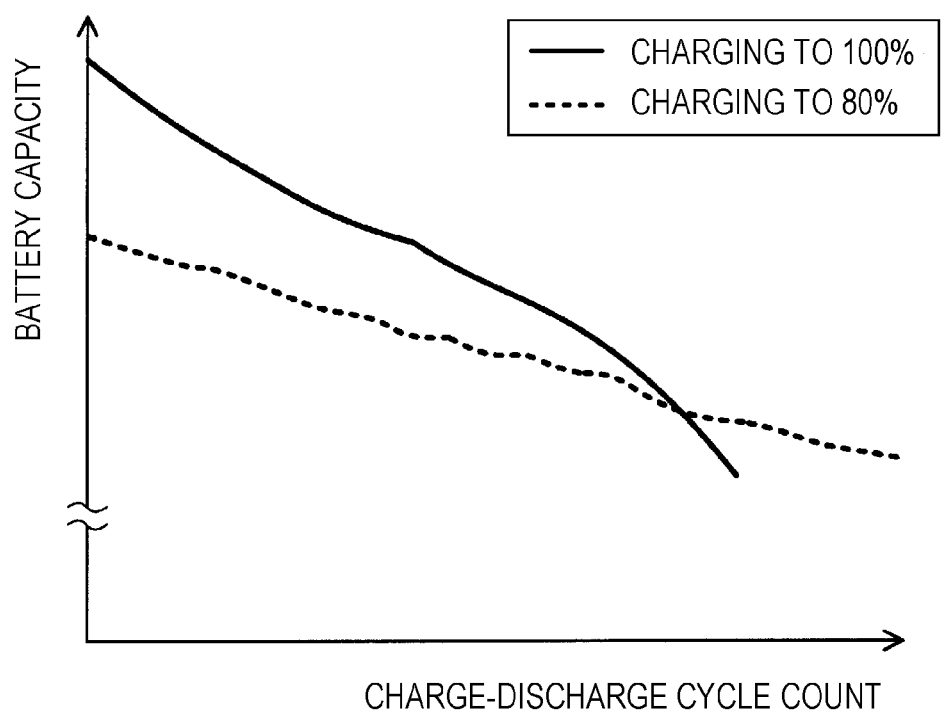
FIG. 2 is a graph illustrating a relationship between a charge-discharge count of a battery and a capacity of the battery.

FIG. 2 is a graph illustrating a relationship between a charge-discharge count of the battery and the battery capacity.

A battery, if repeatedly overcharged, typically suffers from degradation in battery performance. For example, the battery capacity at a fully charged state is gradually decreased, and the battery service life is shortened. As illustrated in FIG. 2, the battery capacity more gradually decreases if a charging operation is repeated until the battery remaining power reaches 80% of the maximum value of the battery capacity than if the charging operation is repeated until the battery remaining power reaches the maximum value of the battery capacity (100%).

Referring back to FIG. 1, if the upper limit of the amount charged by the charging unit 12 is set to the first value, i.e., the maximum capacity of the battery 11, the operable time from the battery 11 subsequent to the end of the charging operation may be long. On other hand, if the upper limit of the amount charged by the charging unit 12 is set to the second value lower than the maximum capacity of the battery 11, the battery 11 is not fully charged with overcharging controlled. Performance degradation of the battery 11, such as a capacity decrease of the battery 11 at the fully charged state and a short service life of the battery 11, is less likely.

In accordance with the power source state history 21, the charging control unit 15 determines whether the electronic apparatus 1 was in a specific past period in a state that the electronic apparatus 1 was unable to be powered by the external power source 2. If the charging control unit 15 determines that the electronic apparatus 1 was throughout the specific past period in a state that the electronic apparatus 1 was able to be powered by the external power source 2, the charging control unit 15 sets the upper limit of the amount charged by the charging unit 12 to the second value lower than the maximum capacity of the battery 11.

If the electronic apparatus 1 was powered from the external power source 2 throughout the specific past period, the electronic apparatus 1 is highly likely to be operable from the external power source 2 from now on continuously. The necessity for lengthening the operable time of the electronic apparatus 1 from the battery 11 is low. The charging control unit 15 thus restricts the upper limit of the amount charged by the charging unit 12 in a manner such that the controlling of the performance degradation of the battery 11 has a higher priority over the operable time from the battery 11.

If the charging control unit 15 determines that the electronic apparatus 1 was not powered from the external power source 2 for at least part of the specific past period, the charging control unit 15 sets the upper limit of the amount charged by the charging unit 12 to the first value, i.e., the maximum capacity of the battery 11. In a state that the electronic apparatus 1 is inoperable from the external power source 2, the electronic apparatus 1 operates from only the battery 11 as a power source, and a longer operable time from the battery 11 is desirable. If the electronic apparatus 1 was inoperable from the external power source 2 for at least part of the specific past period, the electronic apparatus 1 is likely to be used in the same state again. The charging control unit 15 thus causes the charging unit 12 to charge the battery 11 with an amount of power as large as possible for a longer operable time from the battery 11.

The above-described process controls the performance degradation of the battery 11 while providing a sufficiently long operable time of the electronic apparatus 1 from the battery 11 in view a use state of the electronic apparatus 1 (i.e., as to whether the electronic apparatus 1 became inoperable from the external power source 2). The performance degradation of the battery 11 is controlled while the convenience of the user who uses the electronic apparatus 1 is increased.

The electronic apparatus 1 may further include a remaining power detecting unit 16. The remaining power detecting unit 16 detects remaining power of the battery 11. In response to the detection results of the remaining power detecting unit 16, the history registration unit 14 stores on the storage unit 20 the history of the remaining power of the battery 11 as the remaining power history 22.

If the charging control unit 15 determines from the power source state history 21 that the electronic apparatus 1 was not powered from the external power source 2 for at least part of the specific past period, the charging control unit 15 retrieves a minimum value of the remaining power of the battery 11 in the specific past period from the remaining power history 22. The charging control unit 15 sets the upper limit of the amount charged by the charging unit 12 in response to the comparison results of the retrieved minimum value with a specific threshold value th1.

If the minimum value retrieved from the remaining power history 22 is higher than the threshold value th1, the charging control unit 15 sets the upper limit of the amount charged by the charging unit 12 to the second value lower than the maximum capacity of the battery 11. If the minimum value is higher than the threshold value th1, an operable time from the battery 11 that powered the electronic apparatus 1 in the specific past time is considered to be not so long. The charging control unit 15 thus restricts the upper limit of the amount charged by the charging unit 12 in a manner such that the controlling of the performance degradation of the battery 11 has a high priority over the operable time from the battery 11.

If the minimum value retrieved from the remaining power history 22 is equal to or lower than the threshold value th1, the charging control unit 15 sets the upper limit of the amount charged by the charging unit 12 to the first value, i.e., the maximum capacity of the battery 11. If the minimum value is equal to or lower than the threshold value th1, it is considered that the electronic apparatus 1 was operated from the battery 11 for a relatively long time within the specific past period. The charging control unit 15 causes the charging unit 12 to charge the battery 11 with an amount of power as large as possible in a manner such that the operable time from the battery 11 becomes long.

The charging control process of the charging control unit 15 in accordance with the remaining power history 22 controls the performance degradation of the battery 11 without affecting the convenience of the user.

The electronic apparatus 1 may include a battery pack into which the battery 11 and an electronic circuit are integrated. In such a case, processes of the charging unit 12, the history registration unit 14, the charging control unit 15, and the remaining power detecting unit 16 illustrated in FIG. 1 may be performed by the electronic circuit within the battery pack.

The charging control unit 15 may set a value greater than a given value for the first value, and set the given value for the second value.

Second Embodiment

Figure 3:
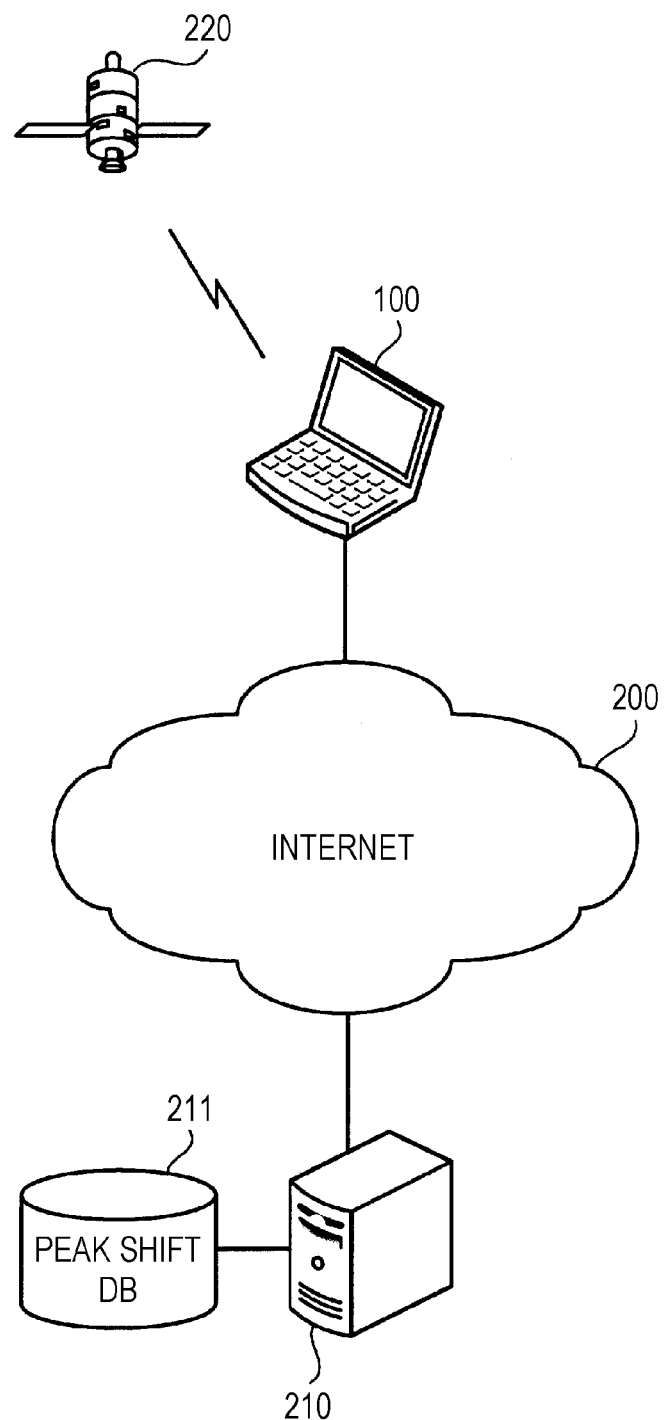
FIG. 3 illustrates a configuration of an information processing system of a second embodiment.

A notebook personal computer (PC) featuring peak shift is described as an example of the electronic apparatus. FIG. 3 illustrates a configuration of an information processing system of a second embodiment.

A notebook PC 100 is a portable electronic apparatus that selectively uses as a power source and operates from an internal battery or an external commercial AC power source. The notebook PC 100 also has a function of charging the battery with voltage supplied from the commercial AC power source.

The notebook PC 100 communicates with a peak shift database (DB) server 210 via the Internet 200. The peak shift DB server 210 may be a server run by an electric power company that supplies commercial AC power. The peak shift DB server 210 stores a service area of commercial power and a peak shift time band in a mapped state. As described below, the peak shift time band is a specific time band of the day within which a power demand on the electric power company is relatively low. The electronic apparatus such as the notebook PC 100 notifies the peak shift DB server 210 of position information of own apparatus via the Internet 200, and receives the peak shift time band corresponding to the notified position information.

The notebook PC 100 may include a global positioning system (GPS) receiver as an example of a unit that fixes the position of own unit. The notebook PC 100 receives radiowaves from GPS satellites 220, and fixes longitude and latitude of own position. In practice, the notebook PC 100 receives radiowaves from a plurality of GPS satellites 220.

Figure 4:
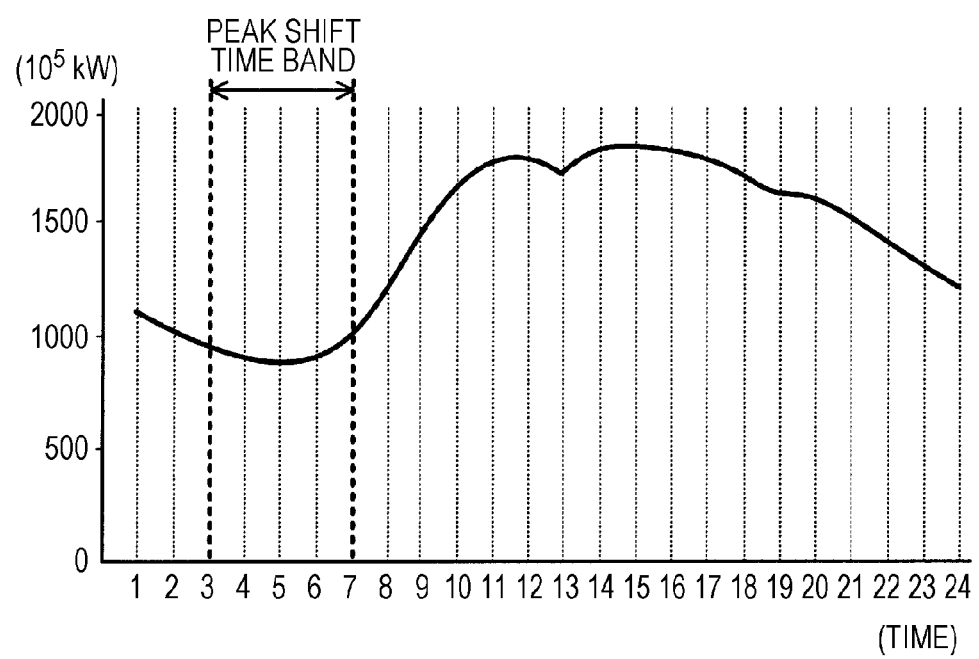
FIG. 4 is a graph illustrating an example of daily power demand on an electric power company.

Peak shift is described below. FIG. 4 is a graph illustrating the power demand of the day on the electric power company.

The power demand on the electric power company varies with time of the day. As illustrated in FIG. 4, the power demand is higher in daytime than in nighttime. The power demand is at a maximum level from 14:00 hours to 15:00 hours. The power demand variations may largely depend on heating or air-conditioning in daytime.

The peak shift refers to an operation in which a side supplied with power reduces power consumption during a time band of a relatively high power demand while increasing power consumption during a time band of relatively low power demand. The peak shift flattens the power demand of the day, thereby lowering the peak value of the power demand.

The notebook PC 100 of the embodiment performs the peak shift by charging the battery during a time band of a relatively low power demand. More specifically, the notebook PC 100 stores a time band of charging the battery as a "peak shift time band." When the present time reaches the peak shift time band, the notebook PC 100 starts charging the battery. On the other hand, during a period of time other than the peak shift time band, the notebook PC 100 does not perform the battery charging operation in principle.

The peak shift time band is automatically set on the notebook PC 100 in response to the power demand on the electric power company. The peak shift time band is set to be at least within a period that does not include a power demand peak time. More desirably, as illustrated in FIG. 4, the peak shift time band is set to be within a period including a minimum power demand time (5:00 hours in FIG. 4).

A peak shift DB 211 connected to the peak shift DB server 210 stores a peak shift time band determined in accordance with the power demand. The notebook PC 100 accesses the peak shift DB server 210, retrieves the peak shift time band stored on the peak shift DB 211, and sets the peak shift time band thereon.

The electric power company sets the peak shift time band in accordance with predictions of the power demand, and stores the predicted peak shift time band on the peak shift DB 211. In this case, the peak shift DB 211 may store the peak shift time bands on a per electric power company basis. Since electric power company as a power supplier is different from region to region, the peak shift DB 211 may store position information of power supply destination, and peak shift time band in a mapped state. The peak shift DB 211 stores the peak shift time band with the electric power company or the position information mapped thereto. The notebook PC 100 retrieves the peak shift time band determined therefor by the electric power company as a power supplier via the peak shift DB server 210.

FIG. 5 illustrates an example of information stored on the peak shift DB 211. The peak shift DB 211 stores position information and names of electric power companies with the start time and end time of the peak shift time band mapped thereto.

The peak shift DB 211 of FIG. 5 stores grid coordinates as an example of the position information. The grid coordinates are obtained by dividing a map by equally spaced latitude lines in north-south direction and by equally spaced longitude lines in east-west direction, and the position of each grid is represented by latitude and longitude. As illustrated in FIG. 5, the grid coordinates are represented by latitude and longitude of the top left corner of the grid (in north-east direction) and latitude and longitude of the bottom right corner of the grid (in south-east direction).

In the peak shift DB 211, a pair of grid coordinate sets are mapped to one electric power company responsible for supplying power to a region indicated by that pair of grid coordinate sets. If the same company supplies power to regions corresponding to a plurality of pairs of coordinate sets, the same company is mapped to the plurality of pairs of coordinate sets. Also in the peak shift DB 211, the start time and the end time of the peak shift time band are mapped to each electric power company. The electronic apparatus such as the notebook PC 100 may retrieve the peak shift time band corresponding to the position of own apparatus by notifying the peak shift DB server 210 of the latitude and longitude of the position of own apparatus, or the name of the electric power company that supplies power to the region where own apparatus is present.

Advantages of the peak shift are stored on the peak shift DB 211. The column of the advantages of the peak shift lists information regarding an advantage the user enjoys by consuming power during the stored peak shift time, and an advantage beneficial to the environment. Also listed in the column is information regarding a discount of an electricity rate the user may enjoy by consuming power during the peak shift time band, and information regarding a contribution to environmental protection achieved by restricting power consumption during the period other than the peak shift time band. In particular, during the period other than the peak shift time band, power demand is high, and the use rate of oil as a power plant fuel increases. The advantage of carbon dioxide emission reduction is provided.

The notebook PC 100 receives information of the peak shift advantage together with the peak shift time band via the peak shift DB server 210, and notifies the user of the peak shift advantage on a monitor.

The peak shift time band on the peak shift DB 211 is appropriately updated in accordance with a power demand prediction by the electric power company. For example, the peak shift time band may be updated once a day. In such a case, when it is the end time of the peak shift time band corresponding to an electric power company stored on the peak shift DB 211, the peak shift DB server 210 writes for registration on the peak shift DB 211 the start time and the end time of the peak shift time band of the next day notified by that electric power company. Upon receiving a request to transmit the peak shift time band from the notebook PC 100, the peak shift DB server 210 returns to the notebook PC 100 a next peak shift time band corresponding to the electric power company supplying power to the location of the notebook PC 100. The peak shift DB server 210 may store on the peak shift DB 211 the peak shift time band daily, monthly, every season, or every specific period of time.

The notebook PC 100 has as charging modes for charging the battery a 100% charging mode in which the battery is charged to 100% of the battery capacity, and a 80% charging mode in which the battery is charged to 80% of the battery capacity. In the 100% charging mode, the charging operation is determined as being complete when battery power reaches 100% of the battery capacity. In the 80% charging mode, the charging operation is determined as being complete when battery power reaches 80% of the battery capacity.

As illustrated in FIG. 2, there is a possibility that the battery is overcharged if the charging operation is performed in the 100% charging mode. The battery may degrade in performance earlier than when the charging operation is performed in the 80% charging mode. In contrast, if the charging operation is performed in the 100% charging mode, the notebook PC 100 has a longer operable time than when the charging operation is performed in the 80% charging mode.

The notebook PC 100 may have a function of automatically switching between the 100% charging mode and the 80% charging mode in view of the use status of own apparatus heretofore when the battery is charged during the peak shift time band. Alternatively, the notebook PC 100 may present a display on a screen to notify the user which of the 100% charging mode and the 80% charging mode is appropriate for charging, and sets the charging mode in response to an operation input entered by the user.

Figure 6:
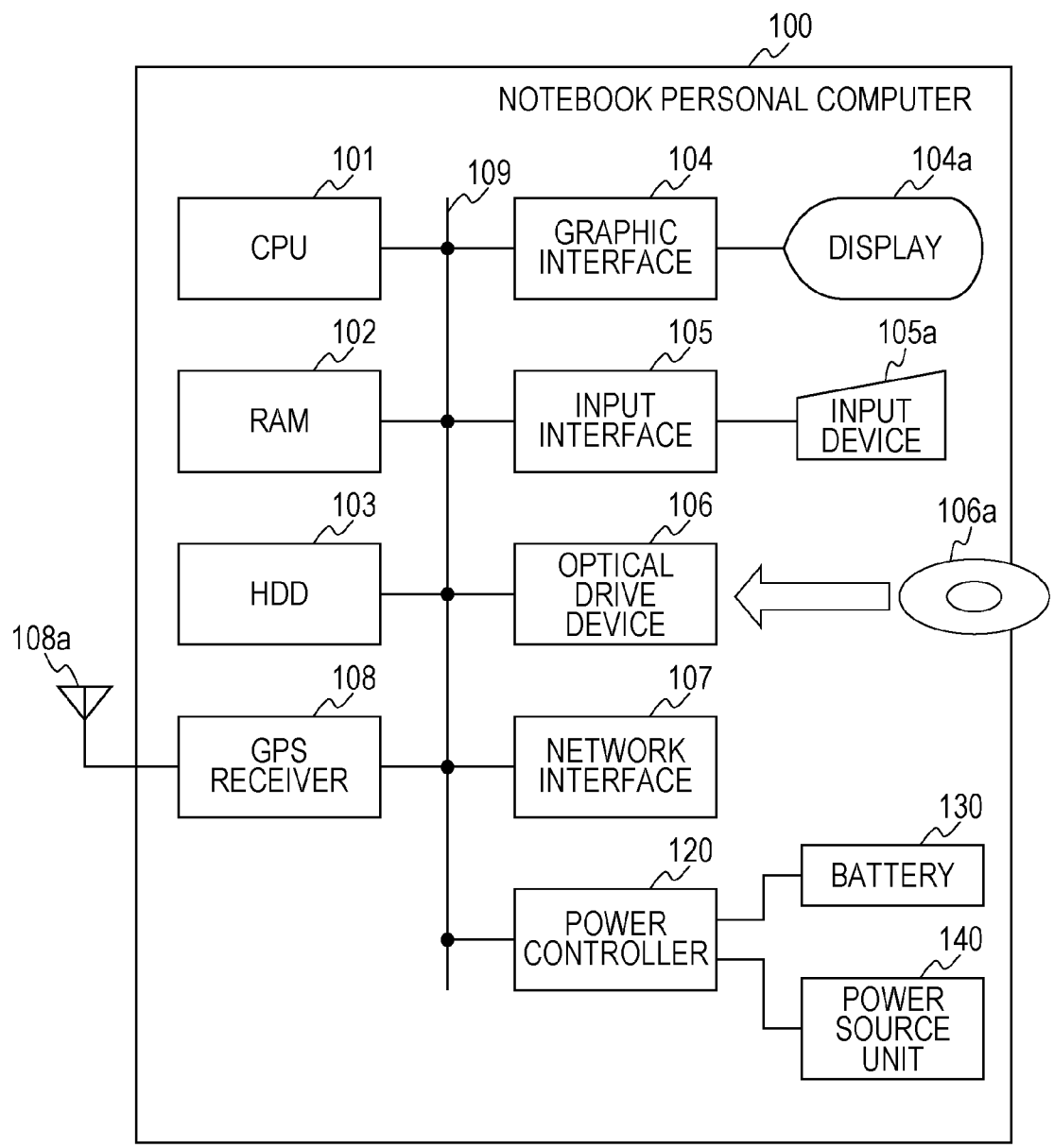
FIG. 6 illustrates a hardware configuration of a notebook personal computer (PC)

The configuration and process of the notebook PC 100 are described below. FIG. 6 illustrates a hardware structure of the notebook PC 100.

The notebook PC 100 is generally controlled by a central processing unit (CPU) 101. The CPU 101 is connected to a random access memory (RAM) 102 and a plurality of peripheral devices via a bus 109.

The RAM 102 is used as a main memory of the notebook PC 100. The RAM 102 temporarily stores an operating system (OS) to be executed by the CPU 101, and at least part of an application program. The RAM 102 also stores a variety of data to be used in processes performed by the CPU 101.

The peripheral devices connected to the bus 109 include hard disk drive (HDD) 103, graphic interface 104, input interface 105, optical drive device 106, network interface 107, GPS receiver 108, and power controller 120.

The HDD 103 writes or reads data magnetically on an internal magnetic disk thereof. The HDD 103 is used as a secondary memory device of the notebook PC 100. The HDD 103 stores the OS, the application program, and a variety of data. Also used as the secondary memory device is a non-volatile memory of a different type, such as a flash memory.

The graphic interface 104 is connected to a display 104a. In response to a command from the CPU 101, the graphic interface 104 displays an image on the display 104a. The display 104a may be a liquid-crystal display.

The input interface 105 is connected to an input device 105a. The input device 105a may include a keyboard, and a touchpanel. The input interface 105 transmits an output signal from the input device 105a to the CPU 101.

The optical drive device 106 reads data stored on an optical disk 106a using a laser light beam. The optical disk 106a is a portable type recording medium on which data are recorded in a manner such that the data are read through light reflections. The optical disks 106a include digital versatile disk (DVD), DVD-RAM, compact disk read only memory (CD-ROM), CD-recordable (CD-R) disk, and CD-rewritable (CD-RW) disk.

The network interface 107 is connected to a network in a building where the notebook PC 100 is installed. Via the network, the network interface 107 communicates with another device connected to the Internet 200.

The GPS receiver 108 receives radiowaves from GPS satellites 220 via an antenna 108a. The notebook PC 100 calculates latitude and longitude in accordance with information extracted from the received radiowaves, and then transfers the latitude and longitude to the CPU 101.

The power controller 120 is connected to battery 130 and power source unit 140. The power source unit 140 supplies the notebook PC 100 with a voltage from the battery 130 or a voltage from a commercial AC power source via an AC adaptor. In response to a request from the CPU 101, the power controller 120 controls a charging operation of the battery 130 and switches sources of voltages that the power source unit 140 supplies to the notebook PC 100. The power controller 120 calculates the remaining power of the battery 130, and notifies the CPU 101 of the remaining power.

Figure 7:
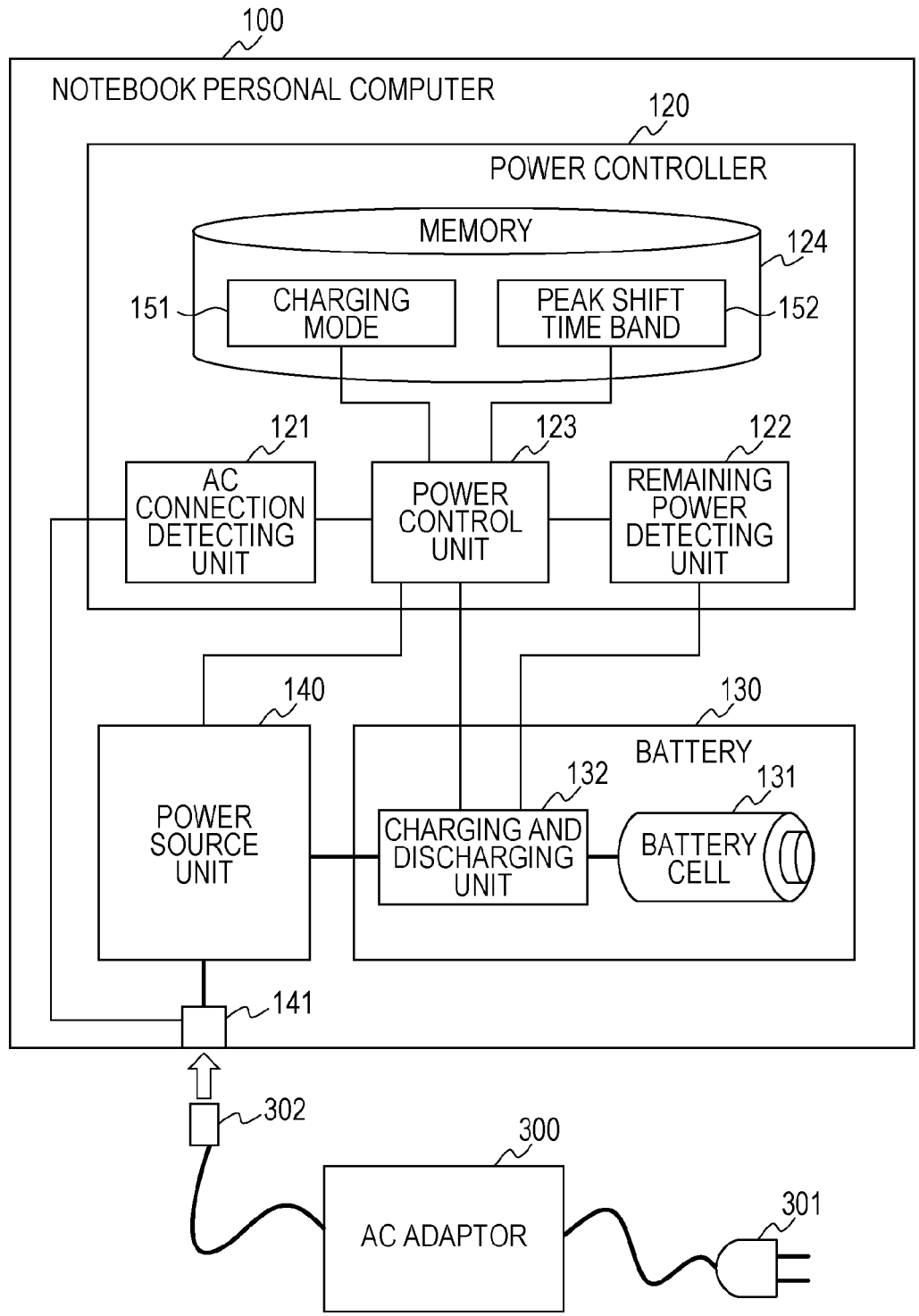
FIG. 7 illustrates a configuration of a power source of the notebook PC.

FIG. 7 illustrates a configuration of a power source of the notebook PC 100.

The notebook PC 100 is supplied with commercial AC power via an AC adaptor 300. The AC adaptor 300 converts an AC voltage supplied via a plug 301 connected to a wall outlet into a direct current (DC) voltage, and outputs the DC voltage from a power plug 302. The notebook PC 100 is provided with a power socket 141. The power plug 302 is received in the power socket 141.

The power source unit 140 under the control of the power controller 120 converts into a specific power source voltage a voltage supplied from the power socket 141 or a voltage supplied from the battery 130, and supplies the power source voltage to the inside of the notebook PC 100. If the voltage is supplied via the power socket 141, the power source unit 140 also supplies to the battery 130 the power source voltage responsive to the supply voltage via the power socket 141.

The power source unit 140 continuously supplies the power to the power controller 120 not only in a power-on state of the notebook PC 100 but also in a power-off state of the notebook PC 100. The power controller 120 operates continuously regardless of the power status of the notebook PC 100. The "power-off state of the notebook PC 100" refers to a state that the power source unit 140 does not supply the power source voltage to at least the CPU 101 of FIG. 6.

The battery 130 includes a battery cell 131 storing charge and a charging and discharging unit 132. The charging and discharging unit 132 under the control of the power controller 120 turns on and off a charging operation to charge the battery cell 131 in response to the supply of the voltage from the power source unit 140 and a discharging operation to cause the battery cell 131 to discharge voltage therefrom to the power source unit 140 with one operation independent of the other operation. The charging and discharging unit 132 also notifies the power controller 120 of a value of a current flowing during the charging operation and a value of a current flowing during the discharging operation.

The power controller 120 includes AC connection detecting unit 121, remaining power detecting unit 122, and power control unit 123. Part of the process of these elements in the power controller 120 may be implemented when a CPU in the power controller 120 executes a specific firmware program.

The power controller 120 internally includes a non-volatile memory 124. The memory 124 stores information of the charging mode 151, and a peak shift time band 152. The charging mode 151 is flag information indicating which of the 100% charging mode and the 80% charging mode the battery 130 is set in. The peak shift time band 152 includes the start time and end time of the peak shift time band received from the peak shift DB server 210.

The AC connection detecting unit 121 detects whether the voltage from the AC adaptor 300 is supplied to the power socket 141 via the power plug 302 (i.e., whether the notebook PC 100 is operable from the commercial AC power source). The AC connection detecting unit 121 outputs a detection result to the CPU 101 and the power control unit 123.

The remaining power detecting unit 122 calculates the remaining power (hereinafter referred to as "battery remaining power") of the battery cell 131. For example, the remaining power detecting unit 122 acquires from the charging and discharging unit 132 an amount of current in the charging operation and an amount of current in a discharging operation, accumulates the amount of current in the charging operation, and subtracts the amount of current in the discharging operation from the accumulated amount of current in the charging operation. The remaining power detecting unit 122 thus calculates a charged amount in the battery cell 131. In accordance with the calculated charged amount, the remaining power detecting unit 122 calculates the battery remaining power (mWh) accumulated in the battery cell 131 and the full charged capacity (mWh) of the battery cell 131 in a fully charged state. The remaining power detecting unit 122 outputs a ratio (%) of the battery remaining power to the capacity at the fully charged state to the CPU 101 and the power control unit 123. The final battery remaining power may be calculated by one of the CPU 101 and the power control unit 123.

The power control unit 123 turns on or off the power selection operation of the power source unit 140, and the charging operation and the discharging operation of the charging and discharging unit 132. When the power socket 141 is supplied with voltage from the AC adaptor 300, the power control unit 123 causes the power source unit 140 to output a power source voltage responsive to the voltage from the AC adaptor 300 in response to the detection result of the AC connection detecting unit 121. If the power socket 141 is not supplied with voltage from the AC adaptor 300, the power control unit 123 causes the power source unit 140 to output a power source voltage responsive to the voltage from the battery 130.

The power control unit 123 has a time measurement function. When the present time is in the peak shift time band 152, the power control unit 123 permits the charging and discharging unit 132 to perform the charging operation. The charging and discharging unit 132 starts charging the battery cell 131. In response to the detection result of the remaining power detecting unit 122, the power control unit 123 causes the charging and discharging unit 132 to start charging the battery cell 131 if the battery remaining power decreases below a certain percentage even in the time period outside the peak shift time band 152.

In accordance with the charging mode 151, the power control unit 123 controls the upper limit of the amount charged by the charging and discharging unit 132. If the charging mode 151 indicates the 100% charging mode, the power control unit 123 causes the charging and discharging unit 132 to perform the charging operation until the battery remaining power detected by the remaining power detecting unit 122 indicates 100%. If the charging mode 151 indicates the 80% charging mode, the power control unit 123 causes the charging and discharging unit 132 to stop the charging operation when the battery remaining power detected by the remaining power detecting unit 122 indicates 80%. The charging mode 151 is set by the CPU 101.

Figure 8:
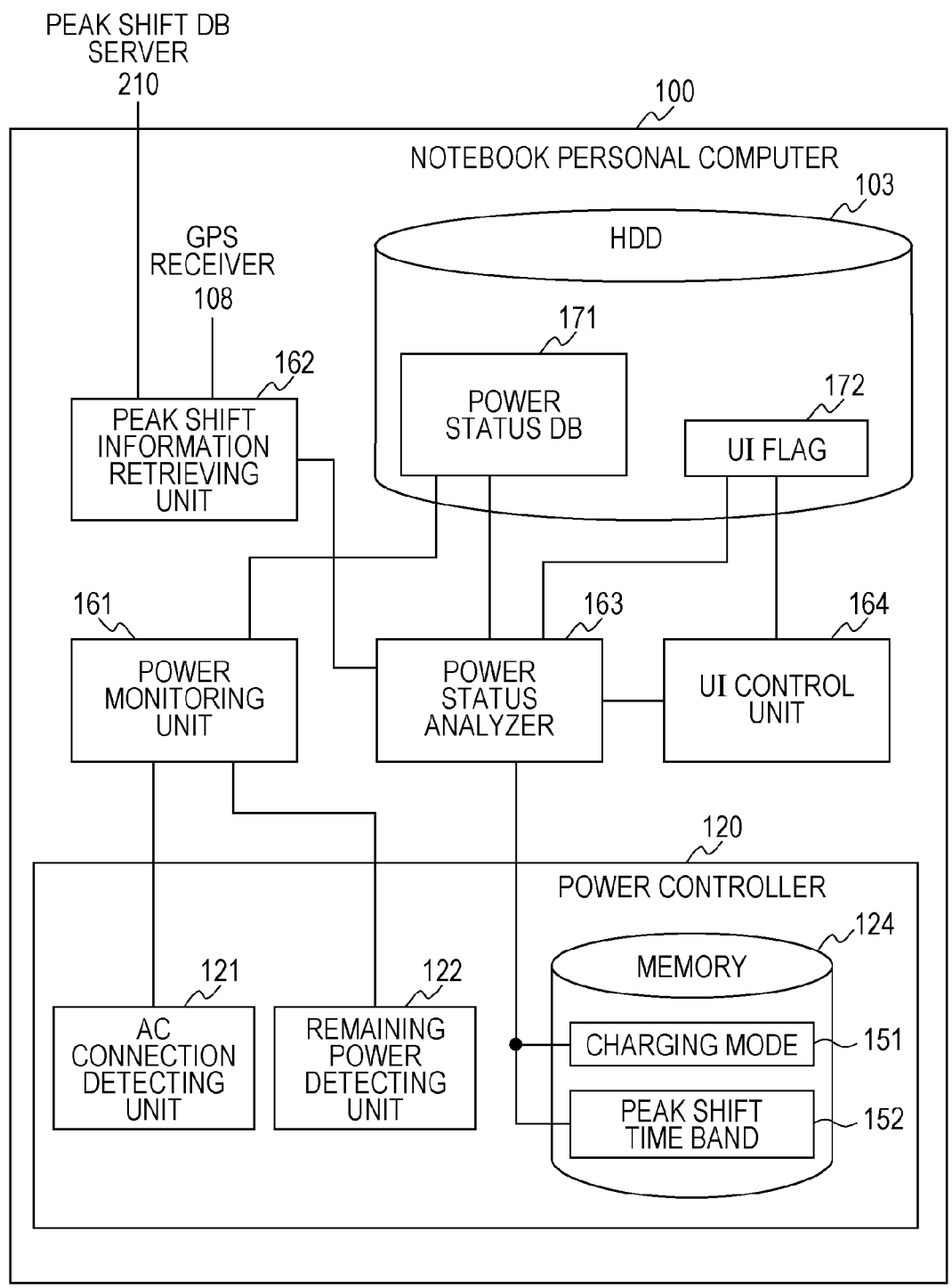
FIG. 8 is a block diagram of a process of the notebook PC executed under the control of an application program.

FIG. 8 is a block diagram of a process of the notebook PC 100 executed under the control of an application program.

The notebook PC 100 includes power monitoring unit 161, peak shift information retrieving unit 162, power status analyzer 163, and user interface (UI) control unit 164. The process represented by each block may be implemented when the CPU 101 executes a specific application program.

The power monitoring unit 161 stores on a power status database 171 in the HDD 103 a history of the detection result of the AC connection detecting unit 121 and a history of the battery remaining power output from the remaining power detecting unit 122.

The peak shift information retrieving unit 162 causes the GPS receiver 108 to fix the position of the notebook PC 100 in response to a request from the power status analyzer 163. The peak shift information retrieving unit 162 notifies the peak shift DB server 210 of the latitude and longitude fixed by the GPS receiver 108, and inquires the peak shift DB server 210 about the peak shift time band. The peak shift information retrieving unit 162 receives from the peak shift DB server 210 the start time and the end time of, and the advantage of the peak shift time band of the electric power company that supplies power at the location of the notebook PC 100.

The power status analyzer 163 causes the start time and the end time of the peak shift time band received by the peak shift information retrieving unit 162 to overwrite the peak shift time band 152 in the memory 124 in the power controller 120. In response to the history stored on the power status database 171, the power status analyzer 163 analyzes the use status of the notebook PC 100 during the specific past period, and determines an appropriate charging mode in accordance with the analysis result.

If a UI flag 172 stored on the HDD 103 is "0," the power status analyzer 163 automatically sets the charging mode determined in accordance with the analysis result of the use status to the charging mode 151 on the memory 124 in the power controller 120. If the UI flag 172 is "1," the power status analyzer 163 causes the UI control unit 164 to display an advice screen, thereby advising the user to set the charging mode. If the user enters a setting permission operation, the power status analyzer 163 sets the charging mode 151. The power status analyzer 163 also notifies the UI control unit 164 of the appropriate charging mode determined in accordance with the analysis result of the use status and the peak shift advantage of the peak shift time band 152. The UI flag 172 is set in response an input operation entered by the user.

If the UI flag 172 is "1," the UI control unit 164 causes the display 104a to display the advice screen in response to a request to the power status analyzer 163. The UI control unit 164 displays on the advice screen the charging mode that the power status analyzer 163 has determined as being appropriate. The UI control unit 164 also displays the peak shift advantage to prompt the user to set the charging mode. In addition to the advice screen, the UI control unit 164 causes the display 104a to display a setting screen to set the UI flag 172 thereon. The UI control unit 164 thus receives the setting operation of the UI flag 172.

A setting mode where the UI flag 172 is "0," i.e., a setting mode where the power status analyzer 163 automatically sets the charging mode 151, is referred to as an "automatic setting mode." A setting mode where the UI flag 172 is "1," i.e., a setting mode where the charging mode 151 is set in response to a user operation after the advice screen is displayed is referred to as a "manual setting mode."

FIG. 9 illustrates an example of information to be stored on the power status database 171.

The power monitoring unit 161 periodically retrieves the detection result by the AC connection detecting unit 121 and the detection result of the battery remaining power by the remaining power detecting unit 122, and then stores the detection results on the power status database 171. According to the embodiment, the power monitoring unit 161 retrieves these pieces of information every 10 minutes, and stores the information on the power status database 171. As illustrated in FIG. 9, the power status database 171 stores, in a mapped state, time and date on which each piece of information is acquired, AC connection status, and battery remaining power.

Of these pieces of stored information, the AC connection status is flag information indicating the detection result of the AC connection detecting unit 121. An AC connection status "1" indicates that the power socket 141 is supplied with the voltage from the AC adaptor 300. An AC status "0" indicates that the power socket 141 is not supplied with the voltage from the AC adaptor 300. The latter case may include a case where the voltage from the AC adaptor 300 is not supplied to the power socket 141 because the power plug 302 is not connected to the power socket 141, or because the plug 301 is not connected to the wall outlet even with the power plug 302 connected with the power socket 141.

Figure 10:
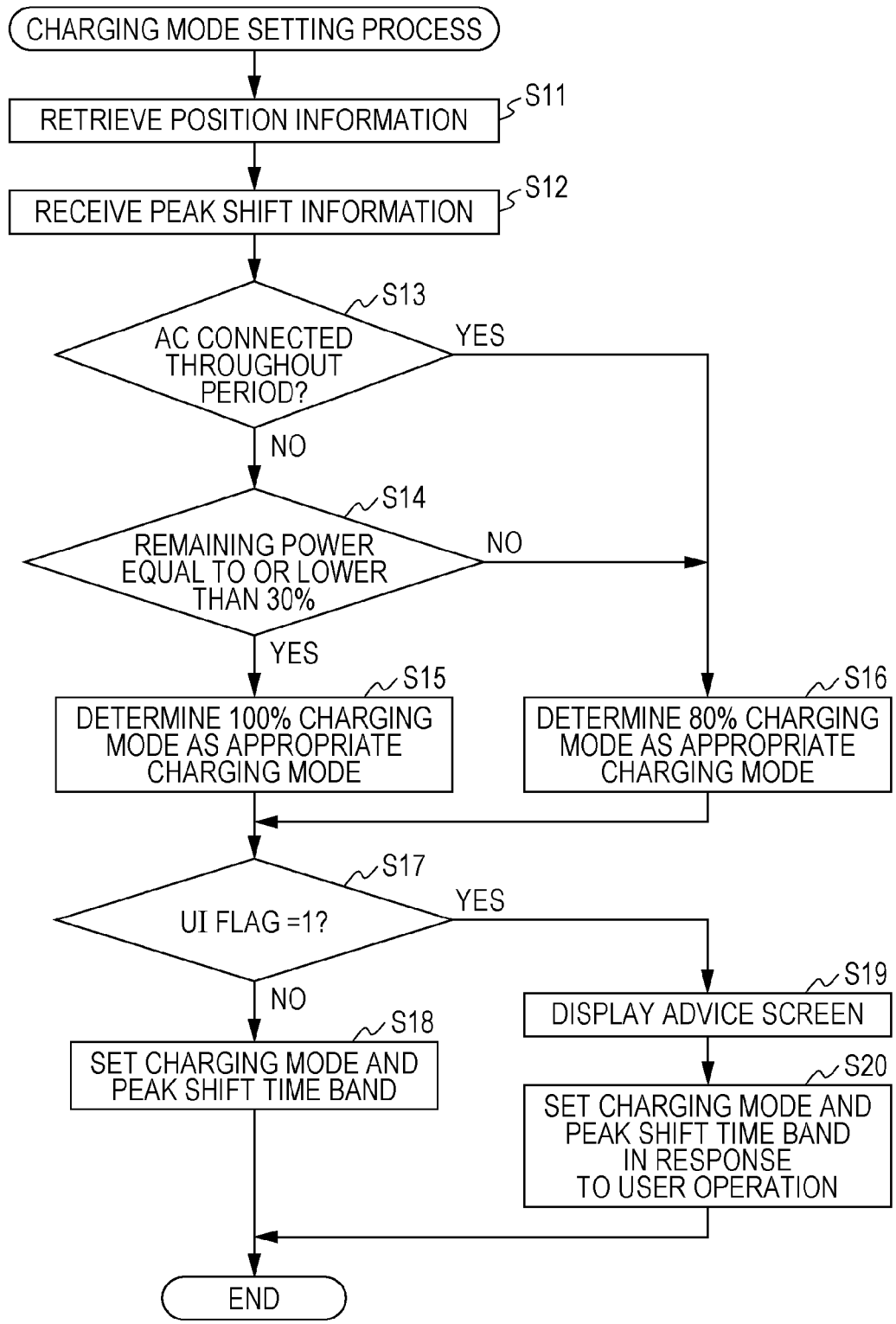
FIG. 10 is a flowchart illustrating a setting process of a charging mode.

The process of the notebook PC 100 is described with reference to a flowchart of FIG. 10. FIG. 10 is the flowchart of a setting process of the charging mode. With the notebook PC 100 powered on, the process of FIG. 10 may be performed under the control of the power status analyzer 163 at least once a day.

Step S11

The power status analyzer 163 requests the peak shift information retrieving unit 162 to retrieve peak shift information. Upon receiving the request, the peak shift information retrieving unit 162 causes the GPS receiver 108 to fix the position (latitude and longitude) of the notebook PC 100, and then retrieves the position information from the GPS receiver 108.

The peak shift information retrieving unit 162 may acquire the position information of the notebook PC 100 using methods different from the method of using GPS satellites. For example, the peak shift information retrieving unit 162 transmits a packet to a position fixing server over the Internet 200. The position fixing server extracts a transmission source Internet protocol (IP) address from the transmission packet from the peak shift information retrieving unit 162, and identifies from the extracted IP address an Internet provider that the notebook PC 100 uses for connection with the Internet 200. The position fixing server returns, to the peak shift information retrieving unit 162 in the notebook PC 100, information about a coverage area of the identified service provider. The peak shift information retrieving unit 162 inquires the peak shift DB server 210 about the peak shift time band, using the coverage area information as the position information.

If the network interface 107 in the notebook PC 100 is a wireless local area network (LAN), the peak shift information retrieving unit 162 may acquire the position information of the notebook PC 100 using a method described below. It is assumed that the Internet 200 or the local area network connected to the notebook PC 100 is connected to a database server having a database that stores in a mapped fashion a media access control (MAC) address at a wireless LAN access point and location information. The peak shift information retrieving unit 162 extracts from a wireless signal the MAC address at the wireless LAN access point that is communicating with the notebook PC 100, and transmits the extracted MAC address to the database server. The database server returns the location information mapped to the received MAC address to the notebook PC 100. The peak shift information retrieving unit 162 inquires the peak shift DB server 210 of the peak shift time band, using the location information as the position information.

Step S12

The peak shift information retrieving unit 162 transmits the position information (latitude and longitude) retrieved from the GPS receiver 108, and inquires the peak shift DB server 210 about the peak shift time band. The peak shift information retrieving unit 162 receives from the peak shift DB server 210 the start time and end time of, and the advantage of the peak shift time band mapped to the transmitted position information, and then notifies the power status analyzer 163 of the received information.

The peak shift information retrieving unit 162 may receive the peak shift time band and the peak shift advantage mapped to the name of the electric power company, by transmitting to the peak shift DB server 210 the name of the electric power company serving as a supplier of commercial AC power, in place of the position information of the notebook PC 100. Alternatively, the peak shift information retrieving unit 162 may search a database stored beforehand on the HDD 103 in accordance with the position information retrieved from the GPS receiver 108, may retrieve the position information or power information, and then may inquire the peak shift DB server 210 about the peak shift time band. Without inquiring the peak shift DB server 210 about the peak shift time band, the peak shift information retrieving unit 162 may perform step S13 and subsequent steps using the position information or the power information received in response to the user operation in step S12.

Step S13

The power status analyzer 163 references, out of the information stored on the power status database 171, the AC connection status during a first period (for example, the past one week down to the present time) prior to the present time of the day. If the AC connection statuses remain to be "1" throughout the first period (i.e., if the voltage from the AC adaptor 300 is supplied to the power socket 141 throughout the specific period), the power status analyzer 163 performs an operation in step S16. If any one of the AC connection statuses is "0" in the specific period (i.e., if the voltage from the AC adaptor 300 was not supplied to the power socket 141 for at least part of the specific period), the power status analyzer 163 performs an operation in step S14.

Step S14

The power status analyzer 163 extracts, from the information stored on the power status database 171, a minimum value of the battery remaining power during a second period (for example, the past one week down to the present time)

prior to the present time of the day. The second period referenced herein may or may not be the first period referenced in step S13. The power status analyzer 163 compares the extracted minimum value with a specific percentage (30% for example) lower than 100% of the battery capacity.

If the extracted minimum value is equal to or lower than 30%, the power status analyzer 163 performs an operation in step S15. If the extracted minimum value is higher than 30%, the power status analyzer 163 executes the operation in step S16.

Step S15

If the notebook PC 100 was used with the voltage from the AC adaptor 300 not supplied to the power socket 141 in the first past period (no branch from S13), and the battery remaining power dropped below 30% of the battery capacity (yes branch from S14), it may be considered that the notebook PC 100 is often used for a relatively long time without using the commercial AC power, for example, the notebook PC 100 is often used in a portable fashion. In such a case, a longer operable time from the battery 130 may be useful for the user. The power status analyzer 163 determines the 100% charging mode as an appropriate mode.

Step S16

If the voltage from the AC adaptor 300 was supplied to the power socket 141 throughout the first past period (yes branch from S13), the probability that the notebook PC 100 is operated from the battery 130 is considered to be low. If the notebook PC 100 was operated with no voltage supplied to the power socket 141 from the AC adaptor 300 in the first past period (no branch from S13) and if the battery remaining power did not become equal to or lower than 30% of the battery capacity in the second past period (no branch from S14), it is considered that time of the notebook PC 100 operated from only the battery 130 is relatively short.

In such cases, the necessity to prolong the operable time of the notebook PC 100 from the battery 130 is low. If the controlling of the performance degradation of the battery 130 is prioritized over the operable time the user convenience is considered unaffected in practice. The power status analyzer 163 thus determines the 80% charging mode as an appropriate charging mode.

If the operation in step S16 is performed, the time throughout which the voltage from the AC adaptor 300 is continuously supplied to the power socket 141 is considered to be relatively long. In such a case, the 80% charging mode controls the overcharging of the battery 130. The performance degradation of the battery 130 is slowed down, and the reliability of the battery 130 is maintained.

Step S17

The power status analyzer 163 references the UI flag 172. If the UI flag 172 is "0," i.e., if the notebook PC 100 is in the automatic setting mode, the power status analyzer 163 performs an operation in step S18. If the UI flag 172 is "1," i.e., if the notebook PC 100 is in the manual setting mode, the power status analyzer 163 performs an operation in step S19.

Step S18

The power status analyzer 163 updates the charging mode 151 set on the memory 124 in the power controller 120 in accordance with the appropriate charging mode determined in step S15 or step S16. The power status analyzer 163 also updates the peak shift time band 152 set on the memory 124 using the start time and end time of the peak shift time band received in step S12.

Step S19

The power status analyzer 163 notifies the UI control unit 164 of the appropriate charging mode determined in step S15 or step S16 and the peak shift time band and the peak shift advantage received in step S12, and requests the UI control unit 164 to display the advice screen. The UI control unit 164 generates the advice screen. The advance screen includes the appropriate charging mode determined by the power status analyzer 163, the start time and end time of the peak shift time band, and the peak shift advantage. The UI control unit 164 causes the display 104a to display the advice screen.

Step S20

If the user who has acknowledged the displayed advice screen enters an input operation to accept the setting of the charging mode and the peak shift time band displayed on the advice screen, the UI control unit 164 notifies the power status analyzer 163 that the user has accepted the setting. The power status analyzer 163 updates the charging mode 151 and the peak shift time band 152 set on the memory 124 in the power controller 120 with the charging mode and the peak shift time band of which the UI control unit 164 is notified in step S19.

If an input operation to cancel the setting of the charging mode and the peak shift time band displayed on the advice screen is performed, the UI control unit 164 notifies the power status analyzer 163 that the input operation to cancel the setting has been performed. The power status analyzer 163 ends the process without updating the charging mode 151 and the peak shift time band 152 currently set on the memory 124 in the power controller 120.

Operations in S19 and S20 may be performed only if the charging mode determined in step S15 or step S16 is different from the charging mode 151 currently set on the memory 124.

In the process of FIG. 10, the charging mode is determined in accordance with condition determination results based on the past use status in steps S13 and S14. The performance degradation of the battery 130 is controlled as much as possible while sufficient battery remaining power is conserved in view of the use status of the notebook PC 100 by the user. The peak shift time band matching the power demand at the location of the notebook PC 100 is automatically retrieved from the peak shift DB server 210.

The appropriate charging mode and the peak shift time band are set in the automatic mode without the user of the notebook PC 100 performing any particular operation. The user convenience is thus increased.

FIG. 11 illustrates a display example of the advice screen.

The UI control unit 164 causes the display 104a to display an advice screen 164a like the one of FIG. 11. The advice screen 164a of FIG. 11 displays sentences that recommend that the peak shift time band be set to be 2:00 hours-6:00 hours, and that the charging mode be set to be the 80% charging mode. The advice screen 164a also displays a setting request button 164b and a display cancel button 164c. If the setting request button 164b is clicked, the UI control unit 164 notifies the power status analyzer 163 that the setting process has been accepted. If the display cancel button 164c is clicked, the UI control unit 164 notifies the power status analyzer 163 that the cancelling of the setting process has been requested. Since the advice screen 164a is displayed in the manual setting mode, the user may enter the setting after verifying the appropriate charging mode and the setting content of the peak shift time band.

The peak shift advantage, enjoyed if the recommended setting is entered, is also displayed on the advice screen 164a. As illustrated in FIG. 11, the peak shift advantages include a discount of 3 yen per 1 kW in electricity rate, and a reduction in the carbon dioxide emissions. The peak shift advantages, if displayed to the user, motivates the users in the peak shift. As a result, notebook PCs featuring the peak shift are expected to be in widespread use, leading to reducing a peak in the power demand, and reducing a load on the environment involved in power generation.

The UI control unit 164 may display the advice screen that allows the setting of the charging mode and the setting of the peak shift time band to be enabled or disabled separately in response to the user input operation. The UI control unit 164 may receive not only the enable input or disable input of the setting, but also may receive a setting value responsive to the user input operation.

Figure 12:
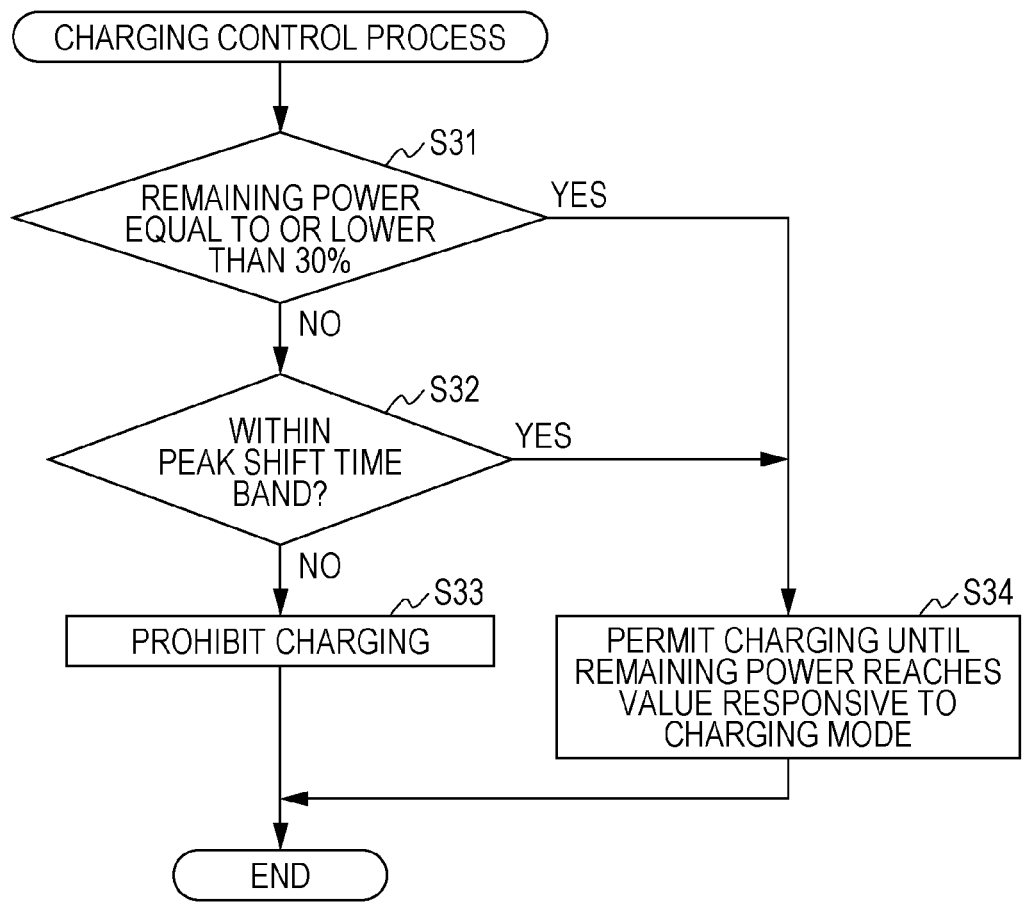
FIG. 12 is a flowchart illustrating a charging control process of a battery.

FIG. 12 is a flowchart illustrating a charging control process of the battery. The power control unit 123 in the power controller 120 performs the process of FIG. 12 every fixed period (every 30 seconds, for example) in the state that the AC connection detecting unit 121 detects that the power socket 141 is supplied with the voltage from the AC adaptor 300.

Step S31

The power control unit 123 retrieves information of current battery remaining power from the remaining power detecting unit 122, and compares the retrieved battery remaining power with a specific percentage of the battery capacity (30% here for example). If the battery remaining power is equal to or lower than 30% of the battery capacity, the power control unit 123 performs an operation in step S34. If the battery remaining power is higher than 30% of the battery capacity, the power control unit 123 performs an operation in step S32.

Step S32

The power control unit 123 determines whether the present time is within the peak shift time band 152 set on the memory 124. If the present time is within the peak shift time band 152, the power control unit 123 performs the operation in step S34. If the present time is not within the peak shift time band 152, the power control unit 123 performs an operation in step S33.

Step S33

The power control unit 123 prohibits the charging and discharging unit 132 from performing the charging operation.

Step S34

The power control unit 123 permits the charging and discharging unit 132 to perform the charging operation. The power control unit 123 continuously permits the charging and discharging unit 132 to perform the charging operation until the battery remaining power detected by the remaining power detecting unit 122 reaches a value indicated by the charging mode 151 set on the memory 124. For example, if the charging mode 151 is set to the 100% charging mode, the power control unit 123 permits the charging operation until the battery remaining power reaches 100%. If the 80% charging mode is set to the charging mode 151, the power control unit 123 permits the charging operation until the battery remaining power reaches 80%.

In the process of FIG. 12, the battery 130 is charged in principle if the present time is within the peak shift time band 152. If the present time is not within the peak shift time band 152, the battery 130 is not charged. In this way, the battery 130 is charged when the power demand is relatively low and the power consumption is reduced in a time band of relatively high power demand. This arrangement thus contributes to flattening the daily power demand.

If the battery remaining power becomes equal to or lower than a specific value even within a time band other than the peak shift time band 152, the battery 130 is charged. This arrangement precludes the possibility of the notebook PC 100 being unusable because of low battery power.

The power control unit 123 controls the upper limit of the charged amount on the battery 130 in accordance with the charging mode 151 set on the memory 124. The charged amount on the battery 130 is optimized in a manner such that sufficient battery remaining power is maintained in view of the use state of the notebook PC 100 by the user, and that the performance degradation of the battery 130 is controlled as much as possible.

The power control unit 123 may control the charging operation to be performed within the peak shift time band 152 but also control a power selection operation of the power source unit 140 in accordance with the peak shift time band 152. More specifically, the power source unit 140 under the control of the power control unit 123 outputs the power source voltage from the voltage of the battery 130 as much as possible within the time band other than the peak shift time band 152 even if the power socket 141 is supplied with the voltage from the AC adaptor 300.

In the operation in step S33 of the process of FIG. 12, the power control unit 123 prohibits the charging operation of the charging and discharging unit 132 while permitting the discharging operation of the charging and discharging unit 132. The power control unit 123 controls the power source unit 140 in a manner such that the power source unit 140 outputs the power source voltage from the voltage supplied from the battery 130. On the other hand, in the operation in step S34, the power control unit 123 causes the charging and discharging unit 132 to start the charging operation while prohibiting the charging and discharging unit 132 from performing the discharging operation. The power control unit 123 controls the power source unit 140 in a manner such that the power source unit 140 outputs the power source voltage from the voltage supplied from the AC adaptor 300.

In the process, the notebook PC 100 is operated from the battery 130 unless the battery remaining power becomes equal to or lower than the specific value in the period other than the peak shift time band 152. This arrangement reduces more the power consumption during the time band of relatively high power demand.

Third Embodiment

Figure 13:
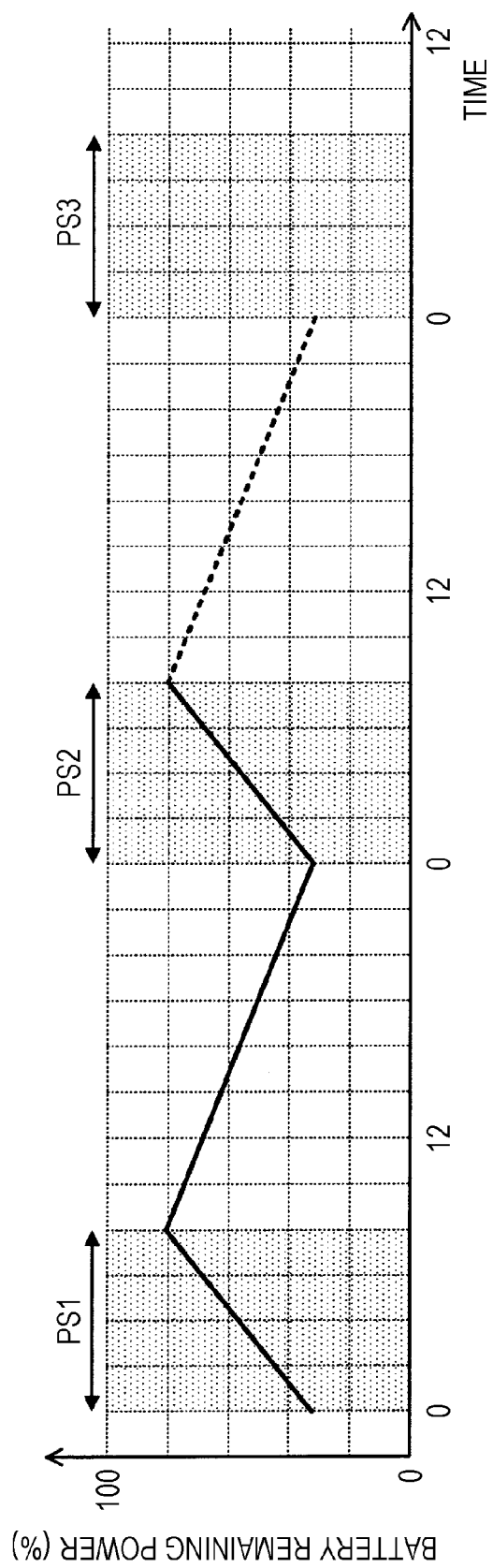
FIG. 13 is a graph illustrating a transition of battery remaining power.
Figure 14:
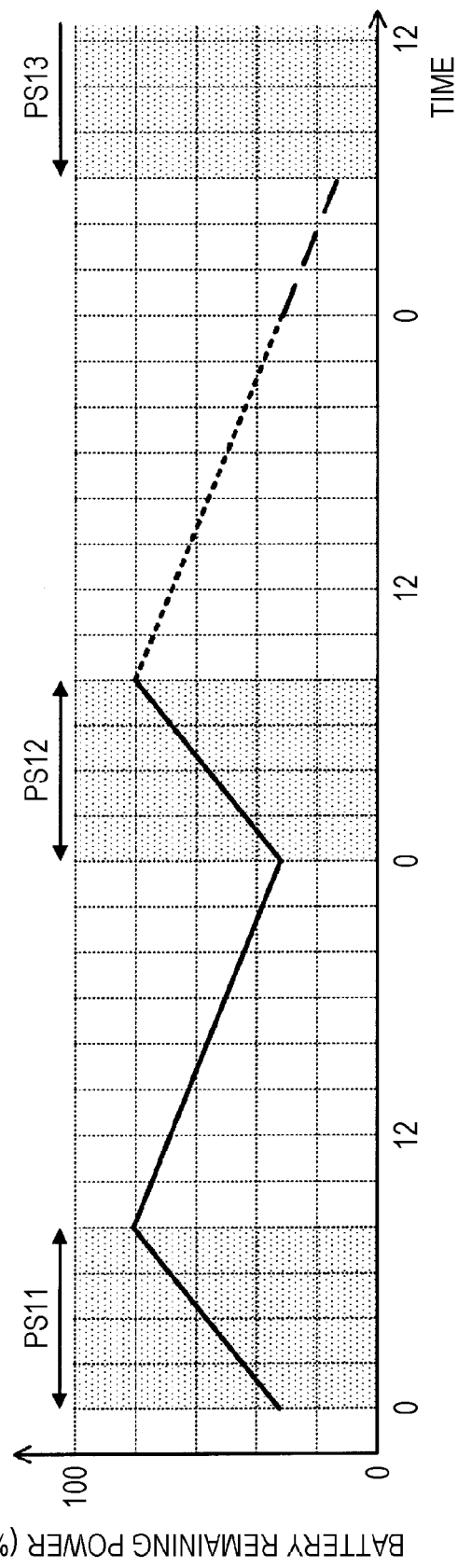
FIG. 14 is a graph illustrating a transition of battery remaining power.
Figure 15:
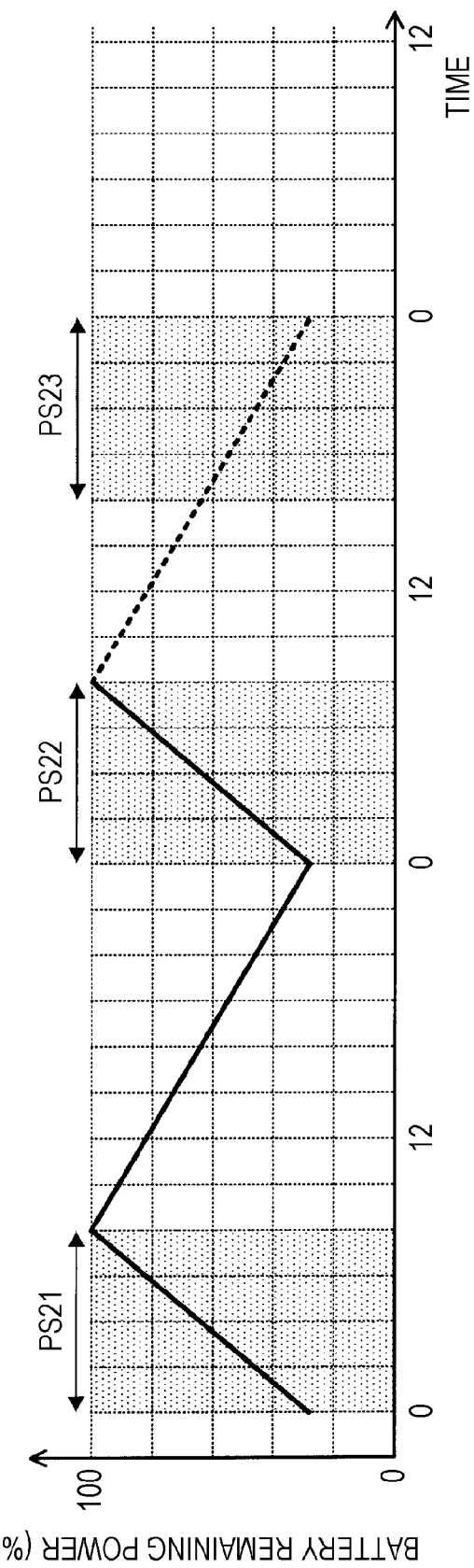
FIG. 15 is a graph illustrating a transition of battery remaining power.

FIGS. 13 through 15 are graphs illustrating transitions of the battery remaining power. For simplicity of explanation in FIGS. 13 through 15, it is assumed that the notebook PC 100 is operated from the battery 130 within the time band other than the peak shift time band, and that a decrease rate of the battery remaining power during the operation is a fixed rate.

If a duration of time from the end of a peak shift time band to the start of a next peak shift time band does not vary greatly, the notebook PC 100 of the second embodiment may set an appropriate upper limit of the charged amount on the battery 130 in a manner such that the user convenience is assured. FIG. 13 illustrates the battery remaining power if the time intervals between the peak shift time bands are equal. As illustrated in FIG. 13, the duration of time from the end time of a peak shift time band PS1 to the start time of a next peak shift time band PS2 is equal to the duration of time from the end time of the peak shift time band PS2 to the start time of a next peak shift time band PS3. It is here assumed that the time intervals of the peak shift time bands during one week or so prior to the peak shift time band PS1 are also equal to the time intervals of FIG. 13.

The power status analyzer 163 in the notebook PC 100 performs the process of FIG. 10 during the period of time from the end time of the peak shift time band PS1 to the start time of the peak shift time band PS2. The power status analyzer 163 performs the determination operation in step S14 of FIG. 10 in accordance with the history of the battery remaining power during the past one week down to the present time, and determines the charging mode in accordance with the determination results. As illustrated in FIG. 13, the time interval from the end time of the peak shift time band PS2 to the start time of the peak shift time band PS3 is equal to each of the time intervals between the peak shift time bands during the preceding one week. If the charging mode is determined in accordance with the process of FIG. 10, the discharged amount of the battery 130 between the peak shift time band PS2 and the peak shift time band PS3 is accurately predicted. Since the battery remaining power at the start time of the peak shift time band PS3 is equal to the battery remaining power at the start time of the peak shift time band PS2 prior to the peak shift time band PS3, the battery remaining power is precluded from being insufficient between the peak shift time band PS2 and the peak shift time band PS3.

Since the power demand on the electric power company changes day by day, the peak shift time band set by the electric power company may also vary day by day. If the electric power company schedules a power outage during a specific time band, the peak shift time band may greatly change after the outage.

As illustrated in FIG. 14, the time interval between the end time of the peak shift time band PS12 and the start time of the peak shift time band PS13 is longer than the time interval between the end time of the peak shift time band PS11 and the start time of the peak shift time band PS12. In such a case, if the power status analyzer 163 in the notebook PC 100 determines the charging mode in accordance with the history of the battery remaining power before the start of the peak shift time band PS12, the battery remaining power at the start time of the peak shift time band PS13 becomes lower than the battery remaining power at the start time of the peak shift time band PS12 prior to the peak shift time band PS13 as denoted by heavy broken line. The battery remaining power may become insufficient prior to the start time of the peak shift time band PS13, thereby possibly inconveniencing the user.

As illustrated in FIG. 15, the time interval between the end time of the peak shift time band PS22 and the start time of the peak shift time band PS23 is shorter than the time interval between the end time of the peak shift time band PS21 and the start time of the peak shift time band PS22. It is assumed in the example of FIG. 15 that the charging operation is performed in the 100% charging mode.

If the power status analyzer 163 in the notebook PC 100 determines the charging mode in accordance with the history of the battery remaining power before the start of the peak shift time band PS22, the battery remaining power at the start time of the peak shift time band PS23 becomes higher than the battery remaining power at the start time of the peak shift time band PS22 prior to the peak shift time band PS23. This means that an amount of power that remains unused from the end of the peak shift time band PS22 to the start of the peak shift time band PS23 is charged during the peak shift time band PS22. The charging operation was to be performed in the 80% charging mode during the peak shift time band PS22, but in practice, the charging operation was performed in the 100% charging mode that can lead to the performance degradation of the battery 130.

In contrast, a notebook computer 100a of a third embodiment determines the charging mode in accordance with an average value of charged amount per unit time, and time from the end time of a first next peak shift time band to the start time of a second next peak shift time band. Even if the peak shift time interval varies greatly, an appropriate charging mode is set such that the user convenience is not affected and such that the battery performance is not degraded.

Figure 16:
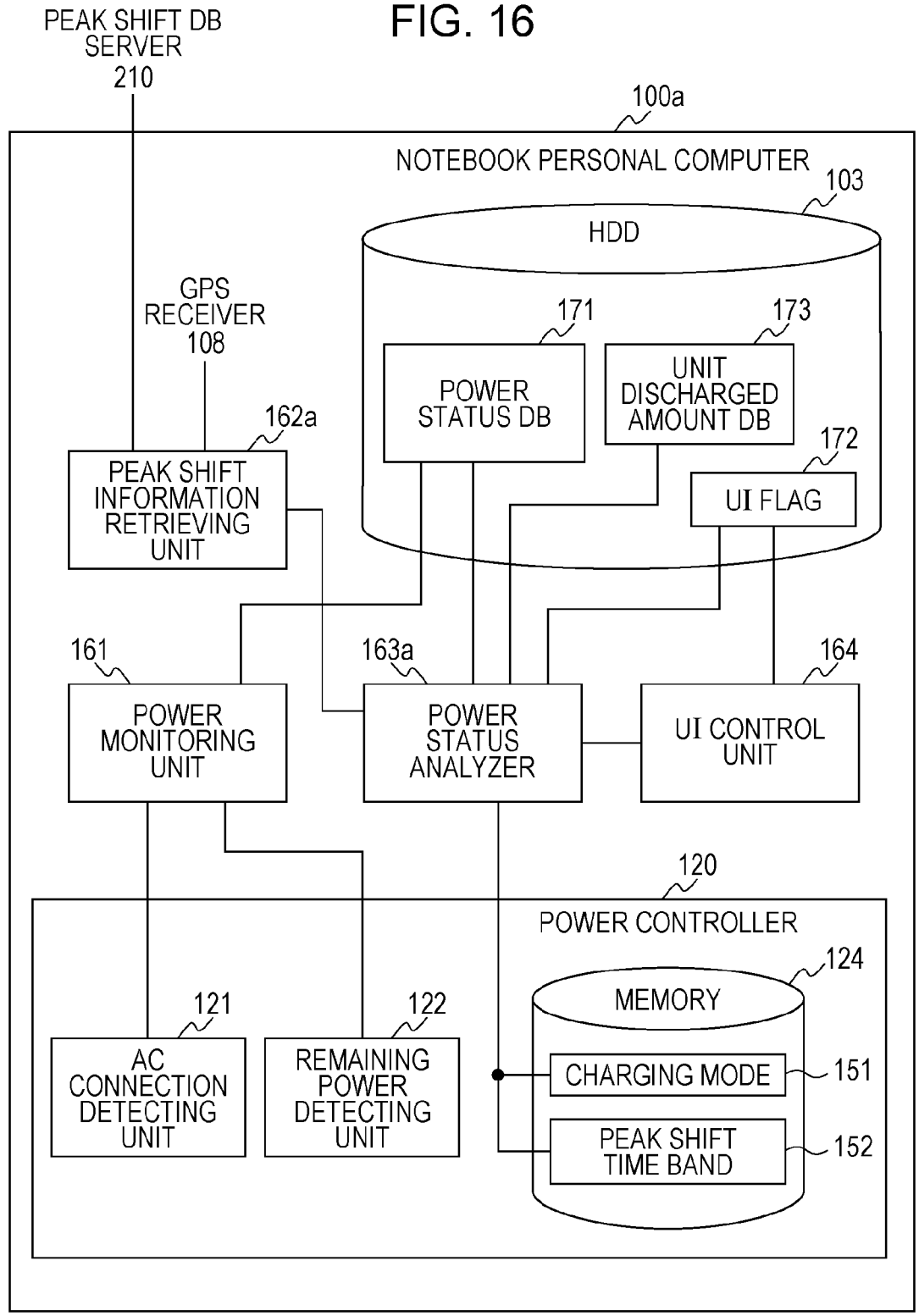
FIG. 16 is a block diagram of a process of a notebook PC of a third embodiment.

FIG. 16 is a functional block diagram of the notebook computer 100a of the third embodiment. In FIG. 16, elements identical to those illustrated in FIG. 8 are designated with the same reference numerals. The notebook computer 100a of the third embodiment has the same hardware structure as the notebook PC 100 of the second embodiment.

The notebook computer 100a of FIG. 16 includes a peak shift information retrieving unit 162a and a power status analyzer 163a respectively in place of the peak shift information retrieving unit 162 and the power status analyzer 163 illustrated in FIG. 8. As the power monitoring unit 161 and the UI control unit 164, the peak shift information retrieving unit 162a and the power status analyzer 163a are implemented when the CPU 101 of the notebook computer 100a executes a specific application program.

As the peak shift information retrieving unit 162 of FIG. 8, the peak shift information retrieving unit 162a retrieves from the peak shift DB server 210 peak shift information corresponding to the position of the notebook computer 100a. The peak shift information retrieving unit 162a further receives from the peak shift DB server 210 the peak shift information of a first peak shift time band and the peak shift information of a second peak shift time band. For this reason, the peak shift DB 211 stores on a per electric power company basis the peak shift information of at least two next peak shift time bands.

The power status analyzer 163a performs a charging mode setting process each time unit time has elapsed. In the charging mode setting process, the power status analyzer 163a calculates a discharged amount (a difference between values of battery remaining power) in unit time in accordance with stored information on the power status database 171, and successively stores the discharged amount on the unit discharged amount database 173 in the unit discharged amount database 173. The power status analyzer 163a calculates an average value of the discharged amounts of the unit times stored on the unit discharged amount database 173. In accordance with the calculated average discharged amount and the length of the period from the end time of a first next peak shift time band to the start time of a second next peak shift time band subsequent to the first next peak shift time band (the length of the period is hereinafter referred to as "non-peak shift time band"), the power status analyzer 163a calculates the battery remaining power to be consumed during non-peak shift time band starting at the end time of the first next peak shift time band. The power status analyzer 163a determines the charging mode based on the value of the battery remaining power to be consumed.

In the discussion that follows, the unit time is 30 minutes. The unit time is set to be equal to or longer than the length between time intervals at which the history is stored on the power status database 171.

Figure 17:
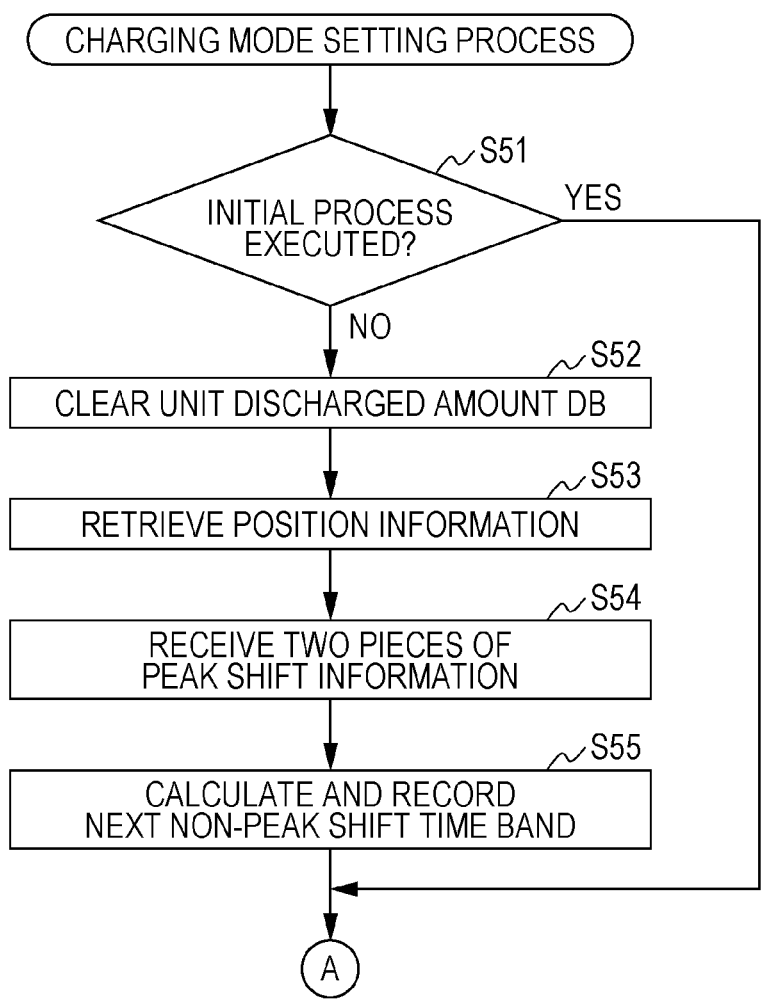
FIG. 17 is a flowchart illustrating a setting process of the charging mode of the third embodiment.
Figure 18:
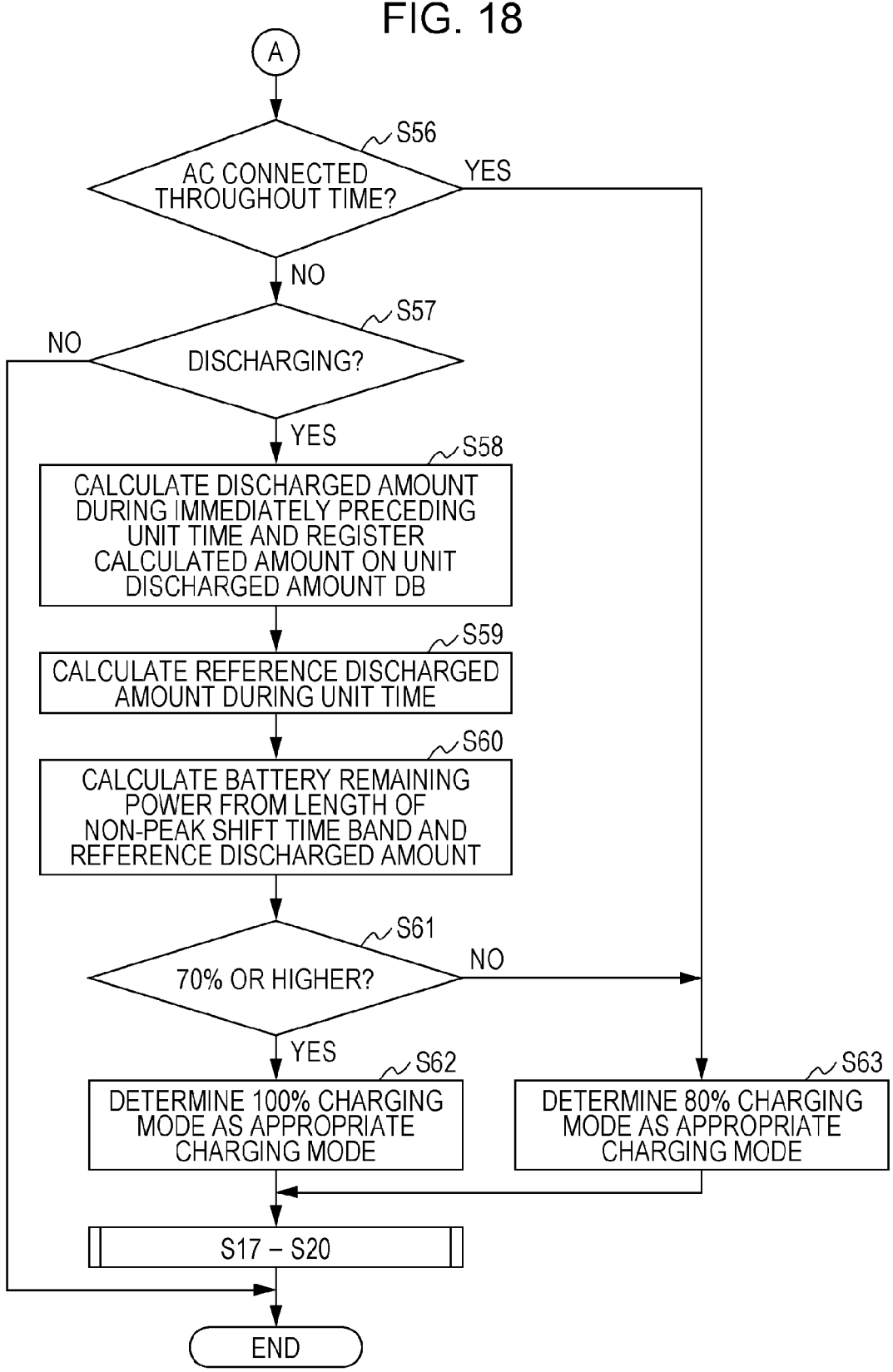
FIG. 18 is a continuation of the flowchart of FIG. 17.

FIGS. 17 and 18 are a flowchart illustrating the setting process of the charging mode of the third embodiment. The process of FIGS. 17 and 18 is repeated under the control of the power status analyzer 163a every unit time (30 minutes) with the notebook computer 100a powered on.

Step S51

Subsequent to a previous peak shift time band, the power status analyzer 163a determines whether an initial process (steps S52 through S55) has been completed. More specifically, the power status analyzer 163a reads the end time from the peak shift time band 152 currently set on the memory 124 in the power controller 120. If the read end time is in the future with respect to the present time, the power status analyzer 163a determines that the initial process has not been executed, and then executes an operation in step S52. If the read end time is in the past, the initial process has been executed. The next peak shift time band 152 has already been set on the memory 124. The power status analyzer 163a performs an operation in step S56.

Step S52

The power status analyzer 163a clears information stored on the unit discharged amount database 173 in the HDD 103.

Step S53

The power status analyzer 163a requests the peak shift information retrieving unit 162a to retrieve the peak shift information. Upon receiving the request, the peak shift information retrieving unit 162a causes the GPS receiver 108 to fix the position of the notebook PC 100a (latitude and longitude) in the same way as in step S11 of FIG. 10, and then retrieves the position information from the GPS receiver 108.

Step S54

The peak shift information retrieving unit 162a transmits the position information (latitude and longitude) retrieved from the GPS receiver 108 to the peak shift DB server 210, and then inquires the peak shift DB server 210 about the peak shift time band. The peak shift information retrieving unit 162a receives from the peak shift DB server 210 the start time and the end time of the first next peak shift time band, and the peak shift advantage mapped to the transmitted position information, and the start time of the second next peak shift time band.

Step S55

The power status analyzer 163a calculates the length of the next non-peak shift time band. More specifically, the power status analyzer 163a subtracts the end time of the first next peak shift time band from the start time of the second next peak shift time band retrieved in step S54. The power status analyzer 163a records the calculated length of the next non-peak shift time band on the HDD 103.

Step S56

The power status analyzer 163a determines the AC connection status during the past first period in the same way as in step S13 of FIG. 10. If all the AC connection statuses in the first period are "1," the power status analyzer 163a performs an operation in step S63. On the other hand, if at least one of the AC connection statuses in the first period is "0," the power status analyzer 163a performs an operation in step S57.

Step S57

The power status analyzer 163a determines whether the battery 130 is currently discharging. The power status analyzer 163a queries the power control unit 123 in the power controller 120 to see if the battery 130 is discharging. If the battery 130 is discharging, the power status analyzer 163a executes an operation in step S58. The power status analyzer 163a ends the process if the battery 130 is not discharging.

Step S58

The power status analyzer 163a retrieves a history of the battery remaining power of the past unit time (30 minutes) down to the present time from the power status database 171. The power status analyzer 163a calculates as the discharged amount per unit time (unit: %) a difference between the battery remaining power 30 minutes ago and the latest battery remaining power in accordance with the retrieved history. The power status analyzer 163a stores the calculated discharged amount of the unit time on the unit discharged amount database 173.

Subsequent to the end of the peak shift time band, the discharged amount per unit time is successively stored on the unit discharged amount database 173 each time the operation in step S58 is performed. The count of discharged amounts stored on the unit discharged amount database 173 may indicate a cumulative discharge time throughout which the battery 130 has discharged since the immediately preceding peak shift time band.

Step S59

The power status analyzer 163a calculates a discharged amount (hereinafter referred to as "reference discharged amount") per unit time (30 minutes) during the non-peak shift time band from the end of the immediately preceding peak shift time band to the present time. More specifically, the power status analyzer 163a sums all the discharged amounts stored on the unit discharged amount database 173, divides the sum of the discharged amounts by a registration count of the discharged amounts on the unit discharged amount database 173 (i.e., the cumulative discharge time) to calculate the reference discharged amount per unit time (unit: %).

Step S60

The power status analyzer 163a calculates the battery remaining power to be consumed at the start of the next non-peak shift time band, in accordance with the reference discharged amount calculated in step S59 and the length (time) of the next non-peak shift time band stored on the HDD 103 at the execution of step S55. If the unit time recorded in step S55 is "minute," the battery remaining power to be consumed (unit: %) is calculated in accordance with an equation "(reference discharged amount)×(length of non-peak shift time band)/30."

Step S61

The power status analyzer 163a compares the battery remaining power to be consumed and calculated in step S60 with a specific threshold value. The specific threshold value may be set to be equal to or lower than the upper limit value (80%) of the charged amount in the charging mode in which the charging operation is stopped prior to reaching 100% of the battery capacity.

If the battery remaining power to be consumed at the start of the next non-peak shift time band is equal to or higher than the threshold value, the power status analyzer 163a performs an operation in step S62. If the battery remaining power is lower than the threshold value, the power status analyzer 163a performs an operation in step S63.

Step S62

If the battery remaining power to be consumed at the start of the next non-peak shift time band is equal to or higher than the threshold value (yes branch in S61), it is considered that the discharged amount during the next non-peak shift time band is relatively large. The power status analyzer 163a determines that the operable time from the battery 130 be lengthened, and thus determines the 100% charging mode as an appropriate charging mode.

Step S63

If the battery remaining power to be consumed at the start of the next non-peak shift time band is lower than the threshold value (no branch in S61), it is considered that the discharged amount during the next non-peak shift time band is relatively small. In such a case, the power status analyzer 163a determines the necessity to lengthen the operable time from the battery 130 is low, and that the performance degradation of the battery 130 is to be controlled. The power status analyzer 163a thus determines the 80% charging mode as an appropriate charging mode.

If the voltage from the AC adaptor 300 was supplied to the power socket 141 throughout the first period (yes branch in S56), the probability that the notebook PC 100 is operated from the battery 130 is low. The power status analyzer 163a thus determines the 80% charging mode as an appropriate charging mode.

Subsequent to step S62 or step S63, the power status analyzer 163a performs operations identical to the operations of the power status analyzer 163 in steps S17 through S20 of FIG. 10 in concert with the UI control unit 164. Unless the user performs a cancel operation, the charging mode determined in step S62 or step S63 is set to be the charging mode 151 on the memory 124 in the power controller 120, and the start time and end time of the next peak shift time band retrieved in step S54 are set to be the peak shift time band 152.

According to the third embodiment, the past use status may indicate the possibility that the battery 130 is discharged during the next non-peak shift time band. The variations of the intervals of the peak shift time bands may cause a next non-peak shift time band to be different from a previous non-peak shift time band. In such a case, an appropriate charging mode is set in a manner free from affecting the user convenience.

The processes of the electronic apparatus 1, and the notebook PCs 100 and 100a are partly or wholly implemented using a computer. A program describing the content of the process of each apparatus is provided, and the process is performed on the computer when the computer executes the program. The program describing the process content may be recorded on a computer readable recording medium. The computer readable recording media include magnetic recording device, optical disk, magneto-optical disk, and semiconductor memory. The magnetic recording devices include a hard disk drive (HDD), a flexible disk (FD), and a magnetic tape. The optical disks include digital versatile disk (DVD), DVD-RAM, compact disk read only memory (CD-ROM), CD-recordable (CD-R) disk and CD-rewritable (CD-RW) disk. The magneto-optical disks include a magneto-optical disk (MO).

To circulate the program, a portable type recording medium such as DVD, or CD-ROM, having the program recorded thereon is sold. The program may be stored on a storage device in a server computer, and may then be transmitted to another computer from the server computer via the network.

The computer executing the program stores onto a storage device thereof the program recorded on the portable type recording medium or the program transferred from the server computer. The computer directly reads the program from the storage device thereof, and performs the process under the control of the program. The computer may receive the program from the server computer connected thereto via the network, and performs the program under the control of the program each time the program is received.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic apparatus that selectively uses as a power source one of a battery and an external power source to be powered therefrom, comprising: a peak shift information retrieving unit that receives, from a peak shift database server, a peak shift time band during which power demand for an electric power company is lower than the power demand during a time period other than the received peak shift time band, the peak shift database server being configured to store each of a plurality of pieces of position information identifying regions to which a plurality of electric power companies are responsible for supplying power, in association with one of the peak shift time bands; a charging unit that charges the battery through the external power source; a power status determining unit that determines whether the external power source is able to drive the electronic apparatus; a history storage unit that stores a history of determination results of the power status determining unit; and a charging control unit that sets, to a first level, an upper limit of battery remaining power at which a charging operation of the charging unit is determined as being complete when the history of the determination results indicates that the external power source was previously unable to drive the electronic apparatus for at least part of a specific past period, and sets the upper limit to a second level lower than the first level when the history of the determination results indicates that the external power source was previously able to drive the electronic apparatus throughout the specific past period, wherein the peak shift information retrieving unit receives the peak shift time band that is associated, by the peak shift database server, with the plurality of piece of position information identifying on a region in which the electric apparatus is currently located so that the received peak shift time band varies depending on a location of the electric apparatus; and the charging control unit permits the charging unit to perform the charging operation during the received peak shift time band, and restricts the charging operation of the charging unit during the time period other than the received peak shift time band.

2. The electronic apparatus according to claim 1, wherein the history storage unit stores a history of battery remaining power of the battery, and
   wherein the charging control unit calculates a discharged amount per unit time in a duration of time extending from an end of the preceding charging period to the present time in accordance with the history of the battery remaining power when the history of the determination results indicates that the external power source was previously unable to drive the electronic apparatus for the at least part of the specific past period,
   calculates battery remaining power to be consumed at a start of a non-charging period, in accordance with the discharged amount per unit time and a length of the non-discharging period from an end time of a first next charging period to a start time of a second next charging period subsequent to the first next charging period, and
   sets the upper limit to the first level or the second level in response to comparison results of the calculated battery remaining power with a specific threshold hold value.

3. The electronic apparatus according to claim 1, wherein the history storage unit further stores a history of battery remaining power of the battery, and
   wherein the charging control unit extracts a minimum value of battery remaining power during a first past period identical to the specific past period, or during a second specific past period from the history of the battery remaining power when the history of the determination results indicates that the external power source was previously unable to drive the electronic apparatus for the at least part of the specific past period, and
   sets the upper limit to the first level when the extracted minimum value is equal to or lower than a specific threshold value, and sets the upper limit to the second level when the extracted minimum value is higher than the specific threshold value.

4. A charging control method of an electronic apparatus that selectively uses as a power source one of a battery and an external power source to be powered therefrom and includes a charging unit that charges the battery through the external power source, the charging control method comprising:

receiving, from a peak shift database server, peak shift time band during which power demand for an electric power company is lower than the power demand during a time period other than the received peak shift time band, the peak shift database server being configured to store each of plural pieces of position information on a region to which the electric power company responsible for supplying power, in association with one of peak shift time bands;

determining whether the external power source is able to drive the electronic apparatus, and storing a history of determination results; and setting, to a first level, an upper limit of battery remaining power at which a charging operation of the electric apparatus is determined as being complete when the history of the determination results indicates that the external power source was previously unable to drive the electronic apparatus for at least part of a specific past period, and setting the upper limit to a second level lower than the first level when the history of the determination results indicates that the external power source was previously able to drive the electronic apparatus throughout the specific past period, wherein the electric apparatus receives the peak shift time band that is associated, by the peak shift database server, with a piece of position information identifying a region in which the electric apparatus is currently located so that the received peak shift time band varies depending on a location of the electric apparatus; and the charging operation is permitted during the received peak shift time band, and the charging operation is restricted during the time period other than the received peak shift time band.

5. The charging control method according to claim 4, further comprising storing a history of battery remaining power of the battery;

calculating a discharged amount per unit time in a duration of time extending from the end of a preceding charging period to the present time in accordance with the history of the battery remaining power when the history of the determination results indicates that the external power source was previously unable to drive the electronic apparatus for the at least part of the specific past period;

calculating battery remaining power to be consumed at a start of a non-charging period, in accordance with the discharged amount per unit time and a length of the non-discharging period from an end time of a first next charging period to a start time of a second next charging period subsequent to the first next charging period; and setting the upper limit to the first level or the second level in response to comparison results of the calculated battery remaining power with a specific threshold hold value.

6. The charging control method according to claim 4, further comprising storing a history of battery remaining power of the battery;

extracting a minimum value of battery remaining power during a first period identical to the specific past period, or during a second specific past period from the history of the battery remaining power when the history of the determination results indicates that the external power source was previously unable to drive the electronic apparatus for the at least part of the specific past period; and setting the upper limit to the first level when the extracted minimum value is equal to or lower than a specific threshold value, and setting the upper limit to the second level when the extracted minimum value is higher than the specific threshold value.

* * * * *